United States Patent
Greene et al.

(10) Patent No.: US 11,255,387 B2
(45) Date of Patent: Feb. 22, 2022

(54) SELECTABLE ONE-WAY CLUTCH WITH IMPROVED ELECTROMAGNETIC MODULE

(71) Applicant: Magna Powertrain Inc., Concord (CA)

(72) Inventors: Darrell Greene, Bradford (CA); Alberto Passos, Mississauga (CA); Dennis (Tak Man) Loui, Richmond Hill (CA); Dusan Milacic, North York (CA); David Gelfand, Concord (CA); Adrian Cioc, Richmond Hill (CA); Ranjit Uppal, Brampton (CA)

(73) Assignee: MAGNA POWERTRAIN INC., Concord (CA)

( * ) Notice: Subject to any disclaimer, the term of this patent is extended or adjusted under 35 U.S.C. 154(b) by 144 days.

(21) Appl. No.: 16/488,286

(22) PCT Filed: Feb. 22, 2018

(86) PCT No.: PCT/CA2018/000035
§ 371 (c)(1),
(2) Date: Aug. 23, 2019

(87) PCT Pub. No.: WO2018/152617
PCT Pub. Date: Aug. 30, 2018

(65) Prior Publication Data
US 2021/0140492 A1    May 13, 2021

Related U.S. Application Data

(60) Provisional application No. 62/489,764, filed on Apr. 25, 2017, provisional application No. 62/462,523, filed on Feb. 23, 2017.

(51) Int. Cl.
*F16H 1/46* (2006.01)
*B60K 17/16* (2006.01)
(Continued)

(52) U.S. Cl.
CPC ............ *F16D 27/118* (2013.01); *F16D 27/14* (2013.01); *F16D 41/12* (2013.01)

(58) Field of Classification Search
CPC ........ F16D 27/09; F16D 27/14; F16D 27/118; F16D 41/04; F16D 41/12
See application file for complete search history.

(56) References Cited

U.S. PATENT DOCUMENTS 4,341,351 A * 7/1982 DeLuca ................. F02M 61/08
239/453
5,638,929 A * 6/1997 Park ....................... F16D 15/00
192/30 V
(Continued)

FOREIGN PATENT DOCUMENTS

WO    2015030983 A1    3/2015
WO    2016170428 A1    10/2016

OTHER PUBLICATIONS

International Search Report and Written Opinion of International Searching Authority for International Application No. PCT/CA2018/000035 dated Feb. 22, 2018; 13 pages.

*Primary Examiner* — Charles A Fox
*Assistant Examiner* — Farhana Pervin
(74) *Attorney, Agent, or Firm* — Dickinson Wright PLLC

(57) ABSTRACT

A controllable one-way clutch assembly having an electromagnetic actuator module equipped with an energizeable coil assembly, a strut moveable in response to energization of the coil assembly from a released position to a locked position, and a latching mechanism operable to releaseably hold the strut in the released position when the coil assembly is not energized.

13 Claims, 16 Drawing Sheets

(51) Int. Cl.
*F16D 27/118* (2006.01)
*F16D 27/14* (2006.01)
*F16D 41/12* (2006.01)

(56) References Cited

U.S. PATENT DOCUMENTS

| | | | | |
|---|---|---|---|---|
| 5,844,457 | A * | 12/1998 | Eckroth | H01H 50/64 |
| | | | | 335/132 |
| 9,127,724 | B2 * | 9/2015 | Kimes | F16D 27/09 |
| 10,337,571 | B2 * | 7/2019 | Cioc | F16D 27/108 |
| 2013/0256078 | A1 | 10/2013 | Kimes et al. | |
| 2015/0060225 | A1 | 3/2015 | Kimes | |
| 2015/0204392 | A1 | 7/2015 | Kimes | |
| 2016/0160941 | A1 * | 6/2016 | Green | F16D 41/16 |
| | | | | 192/71 |
| 2016/0348741 | A1 | 12/2016 | Niemiec et al. | |
| 2017/0204917 | A1 | 7/2017 | Bird et al. | |
| 2018/0094677 | A1 * | 4/2018 | Cioc | F16D 27/06 |

\* cited by examiner

SELECTABLE ONE-WAY CLUTCH WITH IMPROVED ELECTROMAGNETIC MODULE

CROSS-REFERENCE TO RELATED APPLICATIONS

This application is a National Stage of International Application No. PCT/CA2018/000035 filed Aug. 30, 2018, and titled "Selectable One-Way Clutch with Improved Electromagnetic Actuator Module," which claims the benefit of priority U.S. Provisional Patent Application Ser. No. 62/462,523 filed on Feb. 23, 2017, and titled "Selectable One-Way Clutch with Improved Contamination Resistance," and U.S. Provisional Patent Application Ser. No. 62/489,764 filed on Apr. 25, 2017, and titled "Selectable One-Way Clutch with Improved Contamination Resistance," the entire disclosures of each of the above applications are hereby incorporated by reference.

FIELD OF THE INVENTION

The present disclosure is generally related to overrunning coupling devices such as one-way clutches or brakes and, more specifically to selectable one-way coupling (SOWC) devices and/or electrically-controlled one way coupling (EOWC) devices equipped with an improved electromagnetic actuator module.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in automatic transmission is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Typically, a locking member, such as a strut, associated with the one-way clutch is moveable between a non-deployed position to establish a freewheeling mode and a deployed position to establish a locked mode. The strut is commonly biased toward one of its two positions. Such conventional one-way clutches provide no independent control over their modes of operation, that is to say whether they lockup or freewheel in both directions and are commonly referred to as passive one-way clutches. Thus, basic one-way clutches provide the "locked" mode in one rotary direction and the "freewheel" mode in the opposite direction based on the direction that the drive torque is being applied to the input race or drive plate.

There are however, requirements in modern automatic transmissions where a "controllable" overrunning coupling device, commonly referred to as either a selectable one-way clutch (SOWC) or an electrically-controlled one-way clutch (EOWC), can be selectively controlled to provide additional functional modes of operation. Specifically, a controllable one-way clutch may further be capable of providing a freewheel mode in both rotary directions until a command signal (i.e., from the transmission controller) causes a power-operated actuator to shift the coupling device into its lockup mode. Thus, a controllable one-way clutch may be capable of providing a drive connection between an input member and an output member in one or both rotational directions and it may also be operable to freewheel in one or both directions. It is also known in modern automatic transmissions to integrate a passive one-way clutch and a controllable one-way clutch into a combined coupling device, commonly referred to as a bi-directional clutch.

In some instances, the selectable one-way clutches installed in automatic transmissions utilize a hydraulic actuator to selectively actuate the overrunning coupling and shift between the available operating modes. Examples of conventional selectable one-way clutches that are hydraulically-actuated are disclosed in U.S. Pat. Nos. 6,290,044, 8,079,453 and 8,491,439. It is also known to use an electromechanical actuator with the electrically-controlled selectable one-way clutch, one example of which is disclosed in U.S. Pat. No. 8,196,724. As a further alternative, much development has recently been directed to electromagnetic actuators for use with electrically-controlled selectable one-way clutches, examples of which are disclosed in U.S. Pat. Nos. 8,276,725 and 8,418,825 and U.S. Publication 2013/0319810. In many electromagnetic actuators, a rocker-type locking element, commonly referred to as a strut, is pivoted from a first position to a second position in response to energization of a coil assembly. In some such electrically-controlled one-way clutches, a direct-acting configuration is used such that the strut is part of the magnetic circuit and its pivotal movement is caused by an attraction force applied directly to the strut via energization of the coil assembly. Therefore, precise control of the air gap established between the core/pole piece of the coil assembly and the magnetic strut is required to provide robust and reliable lockup functionality. As an alternative, some electrically-controlled one-way clutches are equipped with an electromagnetic actuator having an indirect-acting configuration in which an intermediate component, such as an armature or linkage, is arranged to cause pivotal movement of the strut via energization of the coil assembly.

A need exists to continue development of improved electromagnetic actuators for use in electrically-controlled one-way clutches to provide enhanced functionality and packaging.

SUMMARY OF THE INVENTION

This section provides a general summary of the disclosure and is not intended to be considered a comprehensive listing of all of its aspects, features and objectives.

It is an aspect of the present disclosure to provide a controllable one-way clutch assembly adapted for use in a power transmission device.

It is a related aspect to provide an electromagnetic actuator module for use with an electrically-controlled one-way clutch assembly having one of a direct or an indirect configuration provided between the energizeable coil assembly and a pivotably moveable locking element.

It is another related aspect to provide a one-way clutch assembly comprised of a clutch module and an electromagnetic actuator module having at least one electromagnetic actuator. The electromagnetic actuator includes the energizeable coil assembly, a pivotable locking strut, a coupling arrangement for mechanically moving the locking strut between released and locked positions relative to ratchet teeth formed on a clutch member associated with clutch module.

According to these and other aspects of the disclosure, a one-way clutch assembly is provided. The one-way clutch assembly includes a clutch module having a first clutch component and a second clutch component arranged for rotation relative to the first clutch component and having ratchet teeth. An electromagnetic actuator module is mounted to the first clutch component. The electromagnetic actuator module has an energizeable coil assembly that has a moveable actuator member and a locking member operably connected to the actuator member. The actuator member moves from a first position to a second position in response to energization of the coil assembly for causing concurrent movement of the locking member from a released position disengaged from the ratchet teeth to a locked position engaged with the locking teeth. The locking member includes a pivot post segment pivotably connected to the first clutch component, a first leg extending from the pivot post segment for engaging the ratchet teeth, and a second leg extending from the pivot post segment at an angle relative to the first leg. The actuator member engages the second leg of the locking member and is linearly moveable for causing the pivoting movement of the locking member between the released position and the locked position.

According to this aspect of the disclosure, improved locking member motion and actuation forces are provided by implementing the simple locking member geometry that only pivots about a load bearing area.

According to another aspect of the disclosure, another one-way clutch assembly is provided. The one-way clutch includes a clutch module having a first clutch component and a second clutch component arranged for rotation relative to the first clutch component and having ratchet teeth. An electromagnetic actuator module is mounted to the first clutch component. The electromagnetic actuator module has an energizeable coil assembly that has a moveable pole piece and a locking member operably connected to the actuator member. The locking member is pivotably connected to the first clutch member and is pivotable between a released position disengaged from the ratchet teeth and a locked position engaged with the locking teeth. An armature is pivotably connected to the first clutch component. The armature couples the locking member to the moveable pole piece. Pivoting movement of the armature causes the pivoting movement of the locking member. The armature includes a plate segment having at least one side edge and defining a joint aperture extending into the plate segment from the side edge. The joint aperture receives the moveable pole piece to connect the moveable pole piece to the armature. The pole piece moves from a first position to a second position in response to energization of the coil assembly for causing concurrent movement of the armature and concurrent movement of the locking member from a released position disengaged from the ratchet teeth to a locked position engaged with the locking teeth.

According to this aspect, the arrangement of the joint aperture receiving the moveable pole piece allows the electromagnetic actuator module to easily be assembled and disassembled. Furthermore, it allows various armature and moveable pole piece designs to be utilized according to specific requirements.

According to another aspect of the disclosure, another one-way clutch assembly is provided. The one-way clutch assembly includes a clutch module having a first clutch component and a second clutch component arranged for rotation relative to the first clutch component and having ratchet teeth. An electromagnetic actuator module is mounted to the first clutch component. The electromagnetic actuator module has an energizeable coil assembly that has a moveable pole piece and a locking member operably connected to the actuator member. The moveable pole piece is linearly moveable from a first position to a second position in response to energization of the coil assembly for causing concurrent movement of the locking member from a released position disengaged from the ratchet teeth to a locked position engaged with the locking teeth. The locking member includes a pivot segment that is pivotable relative to the first clutch component, and an end section extending from the pivot segment for engaging the teeth of the second clutch member. A spring extends between the first clutch component and the pivot post segment of the locking member and biases the locking member in the released position. The pole piece is aligned with the end section of the locking member for providing the pivoting movement of the locking member in response to activation of the pole piece. A stationary pole piece is positioned in radial alignment with the moveable pole piece.

According to this aspect, the "direct-action" relationship between the moveable pole piece and the locking member provides a compact and simple arrangement for moving the locking member.

According to another aspect of the disclosure, another one-way clutch assembly is provided. The one-way clutch assembly includes a clutch module having a first clutch component and a second clutch component arranged for rotation relative to the first clutch component and having ratchet teeth. An electromagnetic actuator module is mounted to the first clutch component and has an energizeable coil assembly having a moveable actuator member and a locking member operably connected to the actuator member. The actuator member moves from a first position to a second position in response to energization of the coil assembly for causing concurrent movement of the locking member from a released position disengaged from the ratchet teeth to a locked position engaged with the locking teeth. The locking member includes a pivot post segment pivotably connected to the first clutch component, and a strut segment extending from the pivot post segment for engaging the ratchet teeth when the locking member is in the locked position. The electromagnetic actuator is threadedly coupled with the first clutch member.

According to this aspect of the disclosure, the threaded connection of the electromagnetic actuator to the first clutch member allows the electromagnetic actuator to easily and quickly be coupled with the first clutch member.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the invention.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Example embodiments will now be described more fully with reference to the accompanying drawings. In general, each embodiment is directed to a overrunning coupling device having at least a controllable one-way locking device (i.e. brake and/or clutch) including a moveable locking component (i.e. sprag, strut, etc.) that is controlled via an electromagnetic actuator. Thus, the controllable one-way locking device transmits torque mechanically but is actuated via an electrical actuation system. However, these example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
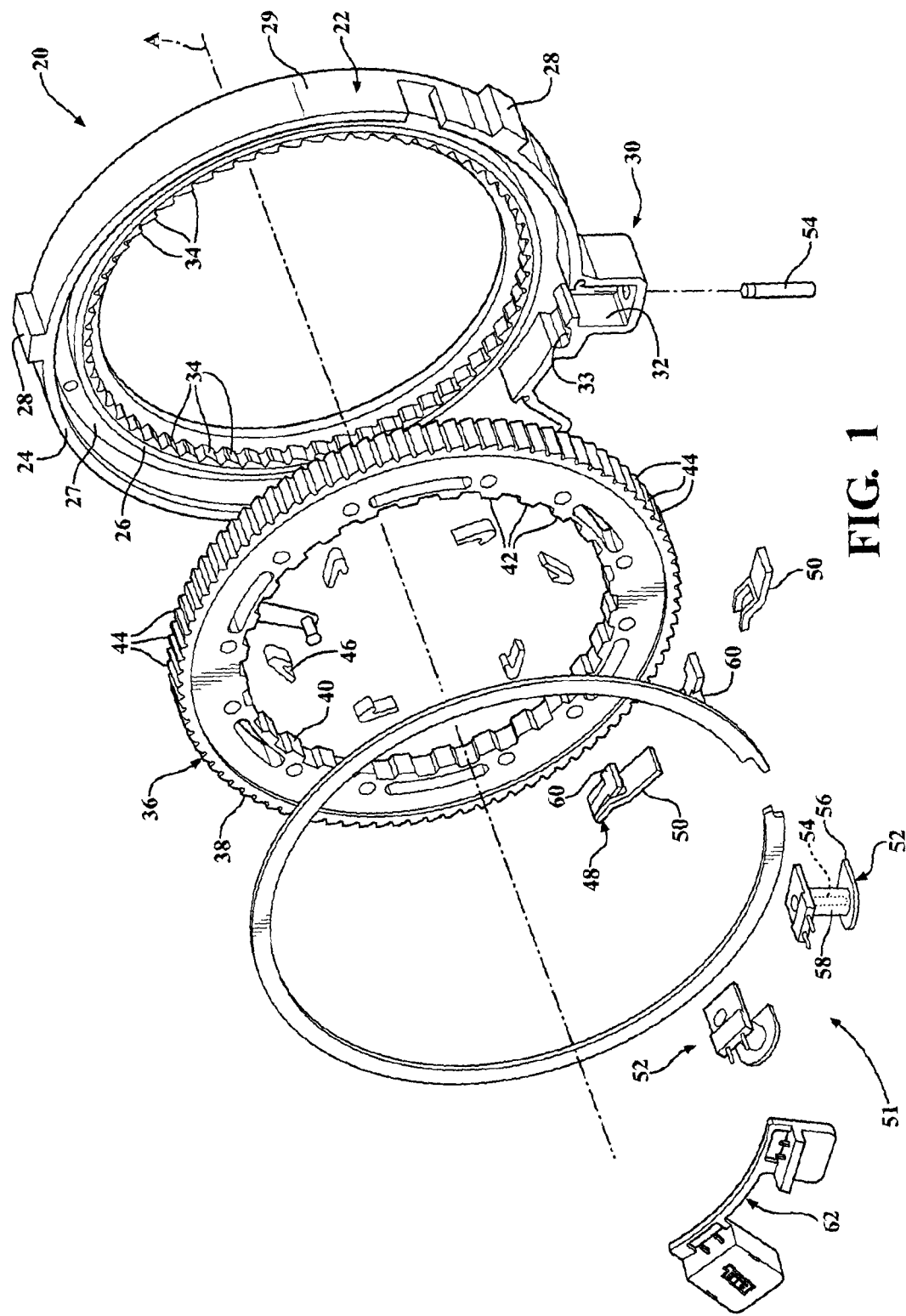
FIG. 1 is an exploded perspective view of a bi-directional clutch assembly configured to include a passive one-way clutch and a controllable one-way clutch having an electromechanical actuator module and to which the inventive concepts of the present disclosure are applicable.

Referring to FIG. 1, an example embodiment of a bi-directional clutch assembly 20 is generally shown in an exploded view. Bi-directional clutch assembly 20 is of a type adapted, for example, for use in an automatic transmission which is controlled using an on-off relay to actuate a friction clutch assembly. Clutch assembly 20 includes a "controllable" overrunning coupling device, commonly referred to as an electrically-controlled one-way clutch (EOWC). For purposes of this application, the term "clutch assembly" should be interpreted to include couplings, clutches and brakes wherein one component is drivingly connected to a torque delivery component of the transmission while the other component is drivingly connected to another torque delivery component or is non-rotatably fixed to a transmission housing or other stationary component.

As will be detailed, bi-directional clutch assembly 20 is shown in this non-limiting embodiment to generally include a first clutch member or outer race, a second clutch member or inner race, a passive one-way clutch having a plurality of passive struts, and a controllable one-way clutch having at least one active strut assembly and electromagnetic actuator, cumulatively defining an electromagnetic actuator module. Clutch assembly 20 also includes a clutch module comprised of outer race 22 and inner race 36. Outer race 22 includes an outer ring segment 24 and an inner ring segment 26 that are spaced radially from one another and interconnected via a radial web segment 27. Outer ring segment 24 includes a plurality of outer lugs 28 that extend radially outwardly for mating with a first component. The first component can be a stationary component (such as a housing of a transmission) or a rotary component (such as a shaft). The outer ring segment 24 further includes a pair of protrusions 30 that extend radially outwardly. Each of the protrusions 30 defines a radially extending actuator pocket 32 and a strut pocket 33. It should be appreciated that more or fewer protrusions 30 could be utilized and that they may be formed integrally with outer race 22 rigidly secured thereto. The inner ring segment 26 includes a plurality of inner ramp surfaces, hereinafter referred to as inner ratchet teeth 34, which extend radially inwardly and are evenly distributed about the axis A.

As noted, the clutch module of clutch assembly 20 also includes inner race 36 that extends annularly about the axis A. The inner race 36 has an outer rim 38 and an inner rim 40 that are spaced radially from one another. The outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for rotation with inner race 36. Further, the outer rim 38 of the inner race 36 includes a plurality of outer ramp surfaces, hereinafter referred to as outer ratchet teeth 44, that extend radially outwardly and are evenly distributed about the axis A.

The passive one-way clutch includes a plurality of passive locking elements, hereinafter passive struts 46, that are supported in strut apertures formed in the inner race 36 for pivotal movement between a locking position and an unlocking position. In the locking position, the passive struts 46 engage the inner ratchet teeth 34 of the outer race 22 for coupling the outer and inner races 22, 36 to one another during counter-clockwise rotation of the inner race 36 relative to the outer race 22. Therefore, engagement by one or more of the passive struts 46 prevents relative rotation of the outer and inner races 22, 36 in the counter-clockwise direction. However, the passive struts 46 still allow relative rotation, i.e., overrun, in the clockwise direction when located in the locked position since they ratchet over the ramped profile of the inner ratchet teeth 34. In the unlocking position, the passive struts 46 are radially spaced from the inner ratchet teeth 34 of the outer race 22, therefore also allowing counter-clockwise rotation of the inner race 36 relative to the outer race 22.

In association with the controllable one-way clutch, an electromagnetic actuator module includes an active strut assembly 48 and an electromagnetic actuator 51. One active strut assembly 48 is disposed within each of the strut pockets 33 formed in the outer ring segment 24. Each active strut assemblies 48 includes an active locking element, hereinafter an active strut 50, that is selectively pivotal between a locked (deployed) and an unlocked (non-deployed) position. In the locked position, the active strut 50 lockingly engages the outer ratchet teeth 44 of the inner race 36, thereby locking the outer and inner races to one another during clockwise movement of the inner race 22 relative to the outer race 22. However, the active strut 50 still allows relative displacement, i.e., overrun, in the counter-clockwise direction. In the unlocked position, the active strut 50 is radially spaced from the outer ratchet teeth 44, thereby allowing the inner and outer races 22, 36 to rotate relative to one another. Furthermore, each of the active strut assemblies 48 also includes an armature 60 that is disposed adjacent to the active strut 50 for providing the pivotal movement of the active strut 50. Thus, the active strut assemblies 48 define an "indirect" actuation arrangement.

The electromagnetic actuator module associated with the controllable one-way clutch also includes a pair of the electromagnetic actuators 51, each including a coil assembly 52 mounted in the actuator pocket 32 and being radially spaced from the active strut 50 and the armature 60. The coil assembly 52 includes a core 54 of a magnetically permeable material, a bobbin 56 disposed about the core 54, and a wire coil 58 wrapped about the bobbin 56. Furthermore, the armature 60 is disposed between the active strut 50 and the coil 58 for pivoting toward the core 54 in response to energization of the coil 58 and thus providing the pivotal movement of the active strut 50. Armature 60 can be made of a magnetic material so as to be magnetically attracted to core 54 upon energization of coil 58 or made of a non-magnetic material so as to be mechanically-coupled to a moveable component (solenoid) in alternative actuators 51.

In a preferred but non-limiting arrangement, when voltage and/or current are applied to the coils 58, the coils 58 become an electromagnet producing an electric field (or flux). The flux flows outwards in all directions and transfers through the small air gap between the armature 60 and core 54 in the center of the coil assembly 52. The core 54 becomes magnetized, therefore attracting the armature 60 towards the core 54. The resulting motion of the armature 60 forces the active strut 50 to mechanically deploy due to the mechanical linkage between the active strut 50 and the armature 60. Upon deployment, the active strut 50 moves from its unlocked position to its locked position where it locates itself against one of the outer ratchet teeth 44 of the inner race 36, effectively locking the inner race 36 from rotating in that direction. Disengagement occurs as voltage and/or current is removed from the coil assembly 52, wherein the armature 60 is demagnetized and free from the coil assembly 52. A biasing member, such as a strut return spring (not shown), is positioned between the active strut 50 and the outer race 22, causing the active strut 50 to move back to its unlocked position during disengagement.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radially stacked clutch assembly 20 offers packaging advantages over its axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

A lead frame 62 is attached to each of the electromagnetic actuators 51 for electrically connecting the coils 58 to one another for coordinated energization of the coils 58. It should be appreciated that the lead frame 62 could connect any number of coils 58. A printed circuit board (PCB) is attached to the lead frame 62 for selectively controlling the energization of the coils 58. The printed circuit board is disposed radially and axially adjacent to one of the coils 58. The lead frame 62 further includes at least one power output contact that is disposed radially and axially adjacent to each of the coils 58 for electrically connecting to the coils 58 to provide power to the coils 58. Any number of power contacts could be utilized to power any number of coils 58. The lead frame 62 also includes a wire harness that extends from the circuit board for connecting to a transmission control module (TCM) or a powertrain control module (PCM) for transmitting data to the circuit board and to power the circuit board. Additionally, the lead frame 62 includes a plastic encapsulation or casing that is disposed about the circuit board and the wires for protecting the circuit board and the wires for allowing the lead frame 62 to be submerged in Automatic Transmission Fluid and operate in −40 C. to +140 C. temperatures. It should be appreciated that the aforementioned configuration of the lead frame 62 and associated components provide a low-cost, modular solution that provides for a more simplified manufacturing process.

Figure 3:
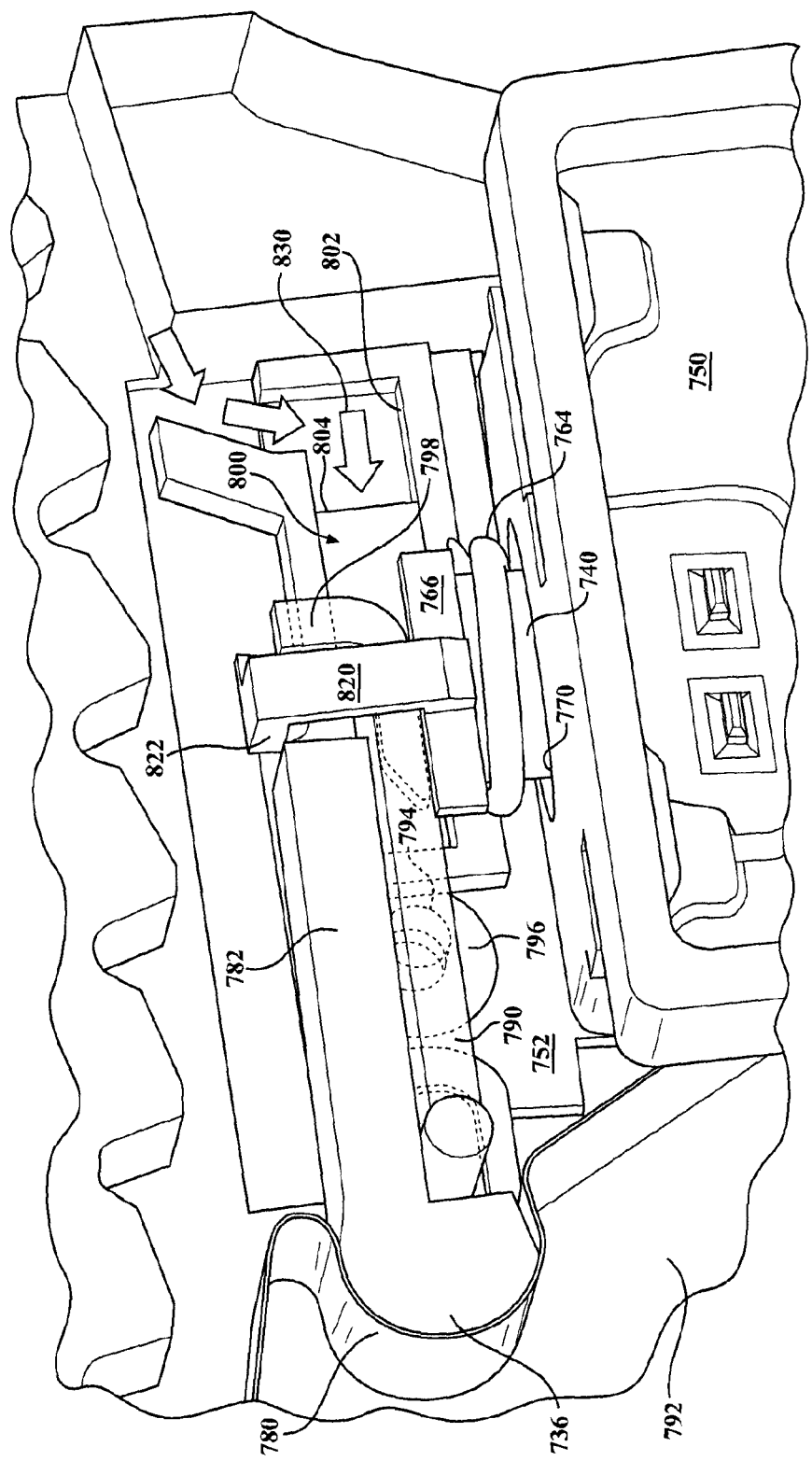
FIGS. 3 and 4 are partial isometric views illustrating hydraulic actuation of a latching mechanism of an electromagnetic actuator module from a non-actuated state into an actuated state when a one-way clutch assembly is operating in a freewheeling mode.

The applied voltage to the coils 58 is comprised of a High Side and Low Side and is supplied by the TCM or the PCM of a vehicle. The High Side (HS) is typically a shared power supply with other loads, and the Low Side is typically a discrete channel (LSD) that controls the discrete/individual circuit. The LSD is capable of controlling the amount of current across the coils 58. Since the LSD is typically located in the TCM/PCM, there is a requirement to have a wire harness between the electromagnetic actuators 51 and the TCM/PCM. If the wire harness suffers mechanical damage and the electromagnetic actuators 51 discrete LSD channel is "short circuited-to chassis ground", the coils may become energized. Accordingly, an Integrated High Side Fail Safe Switch (HSFSS) is provided to add another level of logic in order to control the shared High Side supply. The HSFSS is comprised of the Printed Circuit Board 64 (PCB), a High Side Switch (not shown), a transistor (not shown), and passive components (not shown). They are electrically connected to the lead frame 62. It should be appreciated that the configuration of the lead frame 62 protects the integrated electronic components (including the HSFSS), and provides improved packaging and reduced wiring. Furthermore, it should be appreciated that the modular configuration of the lead frame 62 and associate components could be utilized on other clutch assembly configurations, e.g., axially engaging clutch assemblies. The HSFSS is controlled by the OWCC_HS_ENABLE, which enables the HSFSS to pass current to the coils 58. FIG. 3 illustrates an exemplary embodiment of a circuit that could be utilized with the printed circuit board according to an aspect of the disclosure.

Figure 2:
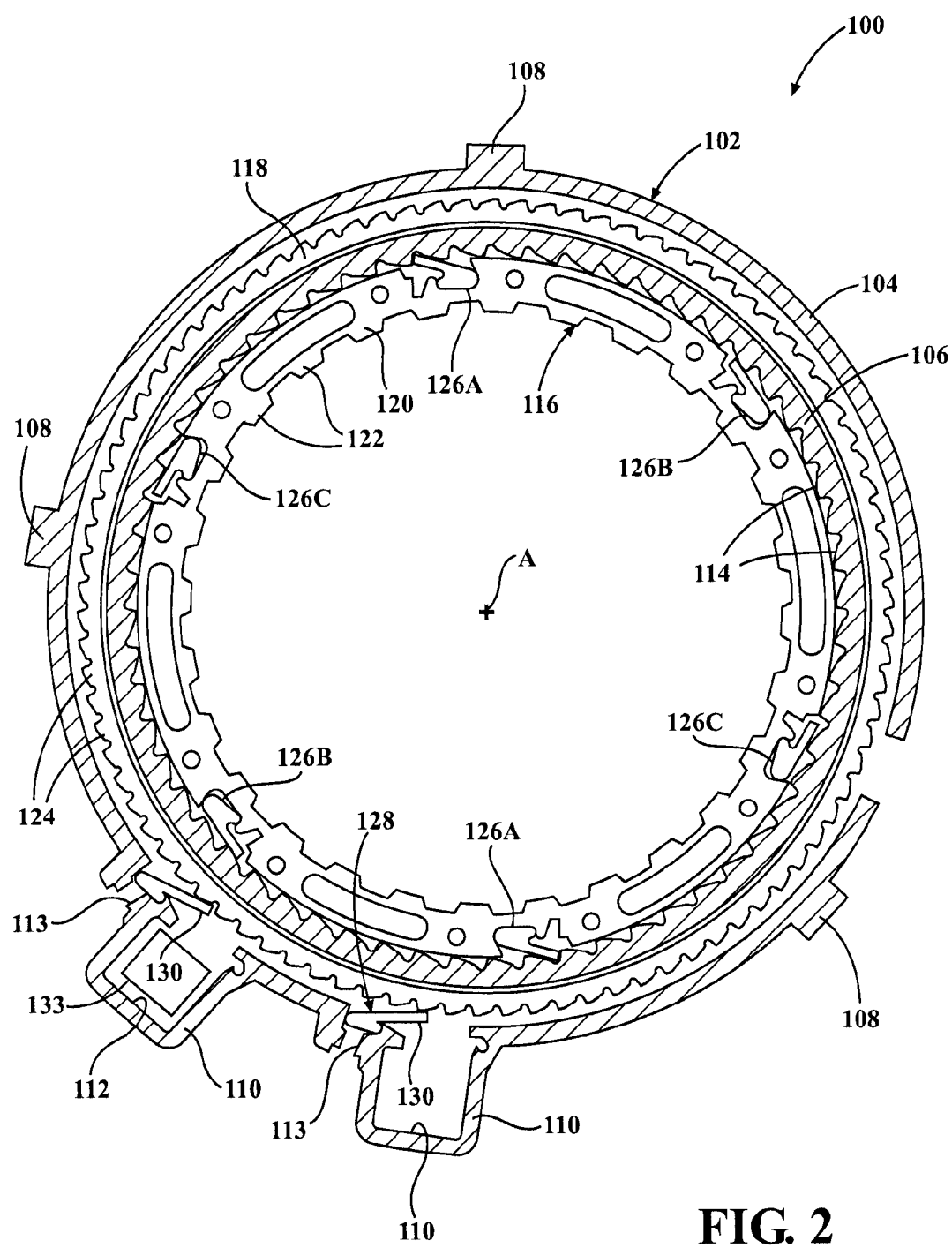
FIG. 2 is a partial sectional view of an alternative version of a bi-directional clutch assembly.

FIG. 2 presents another non-limiting embodiment of a bi-directional clutch assembly 100 is shown. The clutch assembly 100 also includes a clutch module and at least one electromagnetic actuator module. The clutch module includes an outer race 102 (first clutch component) that extends annularly about an axis A. The outer race 102 presents an outer ring segment 104 and an inner ring segment 106 that are spaced radially from one another. The outer ring segment 104 includes a plurality of outer lugs 108 that extend radially outwardly for mating with a first component. The first component can be a stationary component (such as a housing of a transmission) or a rotary component (such as a shaft). The outer ring segment 104 further includes a pair of protrusions 110 that extend radially outwardly. Each of the protrusions 110 defines a radially extending actuator pocket 112 and a strut pocket 113. It should be appreciated that more or fewer protrusions 110 could be utilized. The inner ring segment 106 presents a plurality of ramped inner ratchet teeth 114 that extend radially inwardly and are evenly distributed about the axis A.

The clutch module of the clutch assembly 100 further includes an inner race 116 (second clutch component) that also extends annularly about the axis A. The inner race 116 has an outer rim 118 and an inner rim 120 that are spaced radially from one another with the outer rim 118 disposed radially between the outer and inner ring segments 104, 106 of the outer race 102, and the inner rim 120 disposed radially inwardly from the inner ring segment 106 of the outer race 102. The inner rim 120 of the inner race 116 presents a plurality of inner lugs 122 that extend radially inwardly therefrom for mating with a second component (typically a rotary component). Further, the outer rim 118 of the inner race 116 presents a plurality of ramped outer ratchet teeth 124 that extend radially outwardly and are evenly distributed about the axis A.

The passive one-way clutch associated with bi-directional clutch assembly 100 includes six passive struts 126 that are pivotably supported by inner race 116. It should be appreciated that more or fewer passive struts 126 could alternatively be utilized. The passive struts 126 are moveable for engaging the inner ratchet teeth 114 on the inner ring segment 106 of the outer race 102 for preventing relative displacement of the inner and outer races 116, 102 in the counter-clockwise direction. However, the passive struts 126 allow relative displacement i.e., overrun, between the inner and outer races 116, 102 in the clockwise direction.

In the controllable one-way clutch associated with bi-directional clutch assembly 100, each electromagnetic actuator module includes an active strut assembly 128 and an electromagnetic actuator 133 (schematically shown). Each active strut assembly 128 is received in a corresponding one of the strut pockets 113 of the outer ring segment 104. Each of the active strut assemblies 128 includes an active strut 130 (locking member) that is selectively pivotal between a locked (deployed) and an unlocked, released (non-deployed) position. In the locked position, the active struts 130 engage the outer ratchet teeth 124 on the inner race 116, to prevent relative displacement of the inner and outer races 102, 116 in the clockwise direction. However, the active struts 130 allow relative displacement, in the counter-clockwise direction. In the unlocked position, the active struts 130 are radially spaced from the outer ratchet teeth 124, allowing the inner and outer races 116, 102 to rotate relative to one another.

The combination of the passive and active struts 126, 130 provide for a bi-directional configuration of the clutch assembly 100 that allows engagement in two opposite directions (clockwise and counter-clockwise). It should be appreciated that this concept is also applicable in axially oriented configurations.

To maintain functionality, it is desirable to maintain a consistent amount of backlash between engagement of the passive struts 126 and the active struts 130 so that the clutch assembly 100 is free to disengage in one direction prior to engaging in the opposite direction. Backlash is defined as travel in the opposite direction to current engagement that is required to release a first strut before the second strut is in position to engage in the opposite direction. In other words, bi-directional backlash is the amount of free rotational play forward to reverse that is available between the two engagement points. As noted, with no backlash it is possible for passive and active struts/sprags to be engaged and subsequently not disengage, thereby preventing any relative movement whether it is intended or not. In contrast, with too much backlash, the engagement in both directions may be perceived as rough and unrefined, detrimentally affecting the NVH characteristics of the transmission. As shown in FIG. 2, with no backlash, the passive and active struts 126, 130 may be unable to disengage, preventing any relative motion between the inner and outer races 116, 102, whether it is intended or not.

Figure 4:
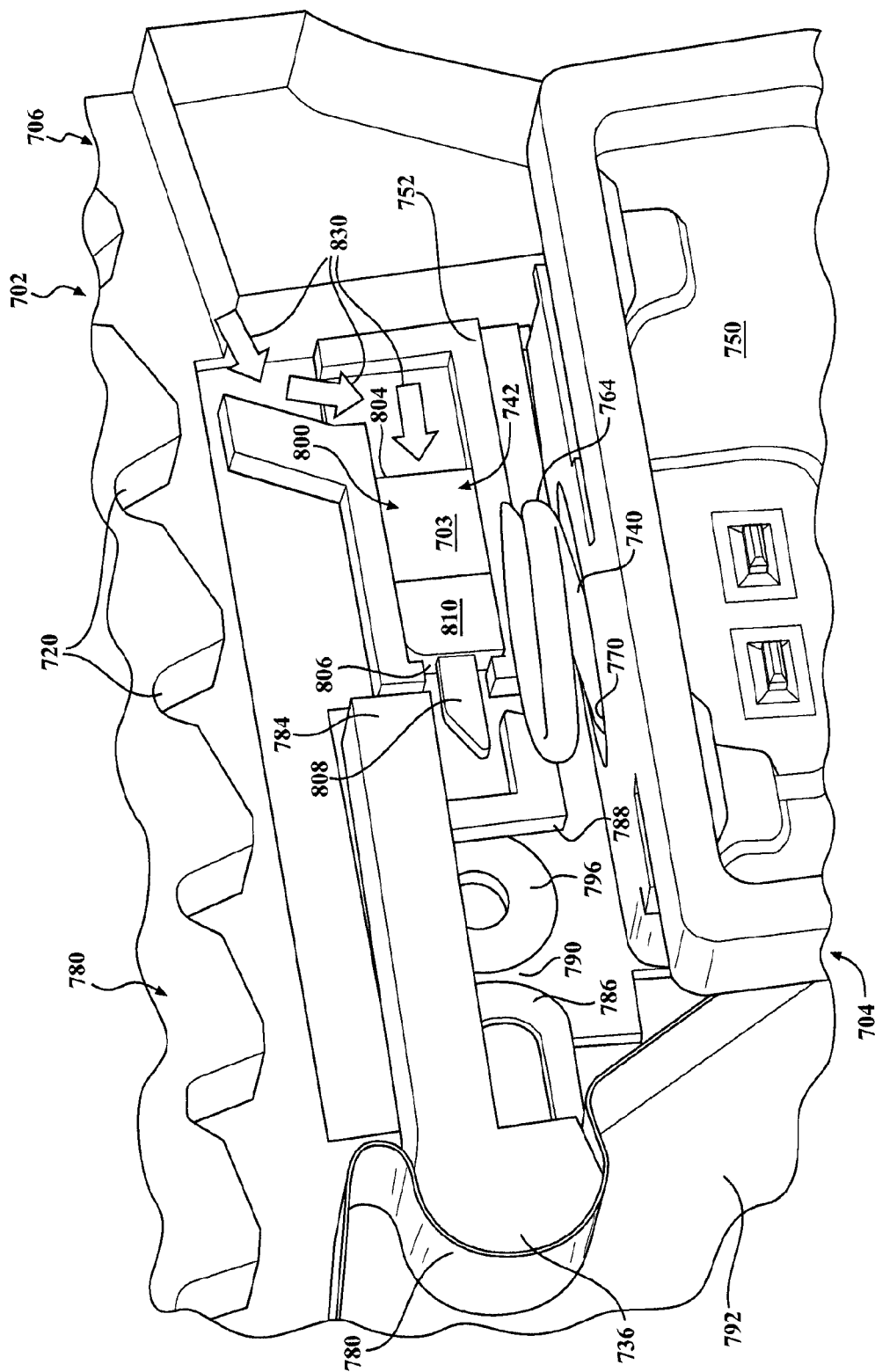
Figure 5:
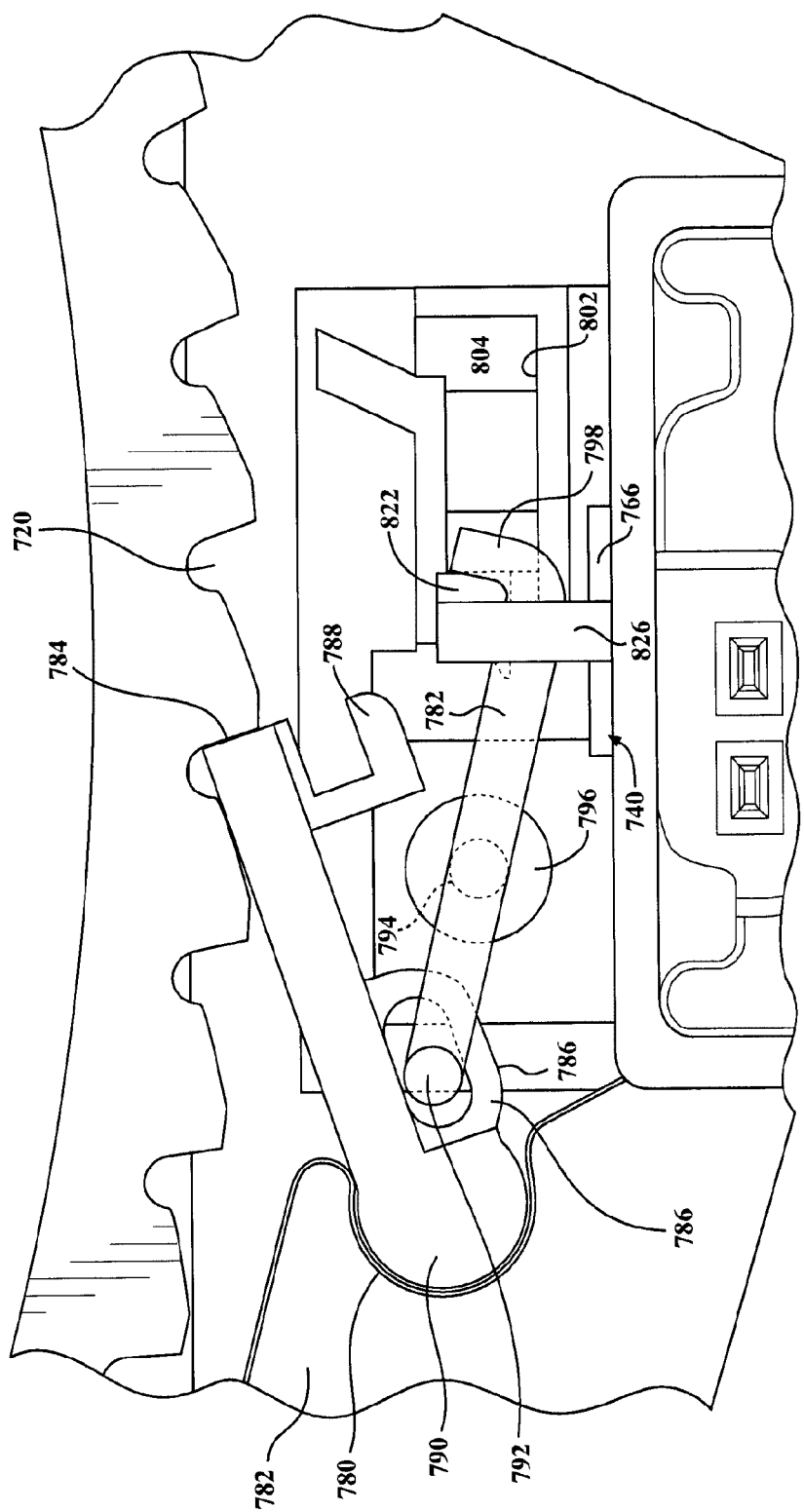
FIG. 5 is another enlarged partial isometric view of the electromagnetic actuator module of FIGS. 3 and 4, when the one-way clutch assembly is operating in a locked mode with the strut located in a locked/deployed position and the latching mechanism is operating in its non-actuated state when the coil assembly is energized.
Figure 6:
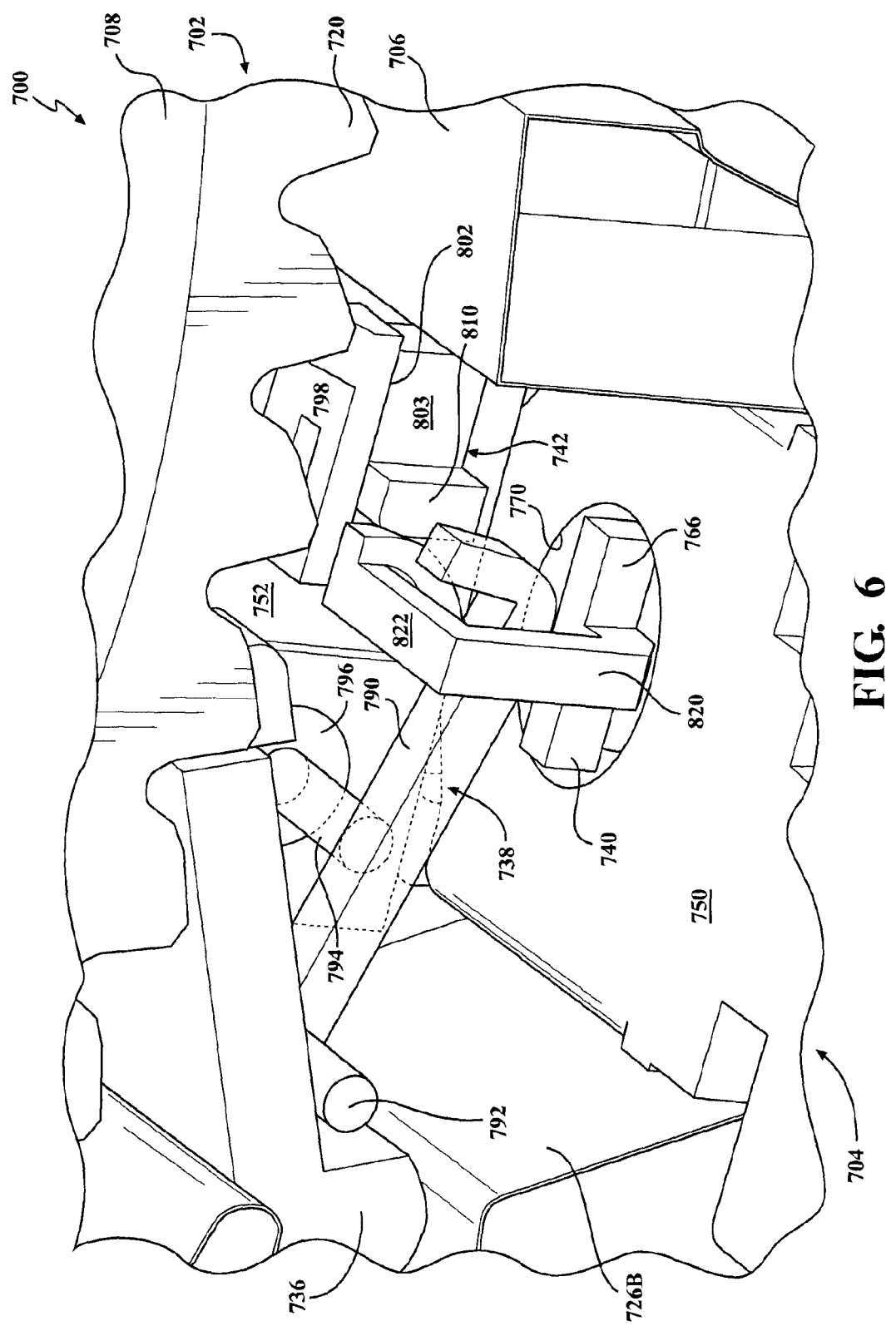
FIG. 6 illustrates the arrangement for shifting the latching mechanism of FIGS. 3 and 4 from its actuated state into its non-actuated state in response to energization of the coil assembly.

As illustrated in FIGS. 3-6, active strut 736 is shown configured to include a pivot post segment 780, an elongated strut segment 782 extending from pivot post segment 780 and terminating in an end segment 784, a guide slot segment 786 extending between pivot post segment 780 and an underside portion of strut segment 782, and a latching segment 788 extending from the underside portion of strut segment 782 adjacent to end segment 784. Pivot post segment 782 of active strut 736 is disposed in a pivot channel 790 formed in strut pocket segment 726B of actuator pocket 726 in outer race 706. Active strut 736 is pivotably moveable between a released/non-deployed position (FIGS. 3 and 4) and a locked/deployed position (FIGS. 5 and 6). As understood, end segment 784 of active strut 736 is released from latched engagement with ratchet teeth 720 on inner race 708 when active strut 736 is located in its released/non-deployed position. In contrast, end segment 784 of active strut 736 is lockingly engaged with ratchet teeth 720 on inner race 708 when active strut 736 is located in its locked/deployed position.

Linkage mechanism 738 includes an elongated link 790 having a first end portion formed with a follower pin segment 792 that is retained in a closed guide slot formed in guide slot segment 786 of active strut 736, an intermediate portion formed with a pivot pin segment 794 that is supported in a pivot bushing 796 mounted to actuator housing 752, and a second end portion formed with a hooked segment 798.

Latching mechanism 742 is shown to include a strut locking piston 800 that is retained for sliding bi-directional movement in a guide channel 802 formed in actuator housing 752. Strut locking piston 800 includes a body segment 803 defining a first end 804 and an opposite second end 806 from which a locking tooth 808 extends. Strut locking piston 800 further includes a piston cam segment 810 extending from body segment 803. Piston 800 is moveable within guide channel 802 between an actuated position (see FIGS. 3-4) and a non-actuated position (see FIGS. 5 and 6). With strut locking piston 800 located in its actuated position, locking tooth 808 is positioned within a latch channel defined by L-shaped latching segment 788 of active strut 736, thereby latching active strut 736 in its released position. In contrast, movement of piston 800 to its non-actuated position acts to retract locking tooth 808 from the latch channel associated with the latching segment 788 of active strut 736, thereby permitting movement of active strut 736 from its released position to its locked position. Thus, latching mechanism 742 is operable in a latched mode (piston 800 in actuated position) to inhibit pivotal movement of strut 736 and in an unlatched mode (piston 800 in non-actuated position) to permit pivotal movement of strut 736. As will be detailed, moveable pole piece 740 includes a leg segment 820 extending from flange segment 766 and which includes a drive cam segment 822 that is arranged to extend over link 790 of linkage mechanism 738. As will be detailed, drive cam segment 822 of moveable pole piece 740 is arranged to interact with both hooked end segment 798 of link 790 and piston cam segment 810 on piston 800.

Referring initially to FIGS. 3-4, controllable one-way clutch assembly 700 is shown with the above-noted components oriented to establish a disengaged or freewheeling mode. Specifically, coil assembly 754 is not energized such that spring 764 is permitted to displace moveable pole piece 740 to an extended position (relative to stationary pole piece 762) which causes flange 766 to act on an underside portion of link 790 near its hooked end segment 798. As link 790 pivots about pivot post 794, in response to movement of pole piece 740 to its extended position, its follower segment 792 acts within guide slot segment 786 so as to cause active strut 736 to pivot into into its released position. In addition, the hydraulic fluid forces generated due to rotation of inner race 708 relative to outer race 706 causes fluid (as indicated by arrows 830) to enter guide channel 802 and act on first end 804 of piston 800, thereby forcibly sliding piston 800 into its actuated position such that its locking tooth 808 retained in the latching channel of latching segment 788 on active strut 736. As such, strut 736 is mechanically latched in its released position so as to inhibit unintended hydraulic deployment. Thus, latching mechanism 742 is shifted into its latched mode via the hydraulic forces applied to piston 800 in response to rotation of inner race 708 relative to outer race 706.

Referring now to FIGS. 5-6, controllable one-way clutch assembly 700 is shown with its components arranged to establish an engaged or locked mode. When this mode is required, inner race 708 is initially slowed relative to outer race 706 to reduce the hydraulic forces acting on piston 800, and coil assembly 754 is subsequently energized such that moveable pole piece 740 overcomes the biasing of spring 764 and is pulled toward stationary pole piece 762, due to the magnetic forces generated by coil assembly 754, so as to locate moveable pole piece 740 in a retracted position (relative to stationary pole piece 762). Such retraction of moveable pole piece 740 causes its drive cam segment 822 to engage piston cam segment 810 so as to forceably move piston 800 within guide channel 802 from its actuated position into is non-actuated position. This mechanical camming action is used to shift latching mechanism 742 into its unlatched mode. As noted, with piston 800 located in its non-actuated position, latching mechanism 742 is released and does not inhibit movement of active strut 736 from its released position into its locked position. Subsequent movement of active strut 736 to its locked position is caused by drive cam segment 822 on moveable pole piece 740 engaging a topside surface of link 790 near its second end segment 798 which, in turn, causes link 790 to pivot about pivot pin 794. Such pivotal movement of link 790 results in pivotal movement of active strut 736 to its locked position with its end segment 784 engaged with one of ratchet teeth 720.

Thus, strut latching mechanisms 742 has been integrated into controllable one-way clutch assembly 700 to prevent unintended hydraulic lifting of the active strut 736. The use of the fluid pressure/force applied to the locking piston 800 provides a means for hydraulically-actuating latching mechanism 742. General considerations—adequate surface finish, material selection and tolerances at the pivoting and sliding joints is critical for the functionality of one-way clutch assembly 700 and will ensure minimized friction and gaps to avoid friction losses and prevent contamination from entering such joints. Minimized contact areas will also limit contamination issues. Additionally, the spring force of spring 764 must be strong enough to prevent hydraulic forces and typical vehicle shock loads from unintentionally moving pole piece 740 when not commanded by the electromagnetic forces generated upon intended energization of the coil assembly 754. While FIGS. 3-6 illustrate a controllable one-way clutch arrangement, those skilled in the art will appreciate that this arrangement can easily be integrated into one of the bi-directional clutch assemblies previously described. Additionally, one-way clutch assembly 700 can be equipped with more than one electromagnetic actuator module 704. Orientation of a second electromagnetic actuator module, in a mirror-image to module 704 as shown, could permit independent actuation to provide a locked mode in both directions. Obviously, the profile of ratchet teeth 722 would need to be modified to accommodate the bi-directional locking feature.

Figure 7:
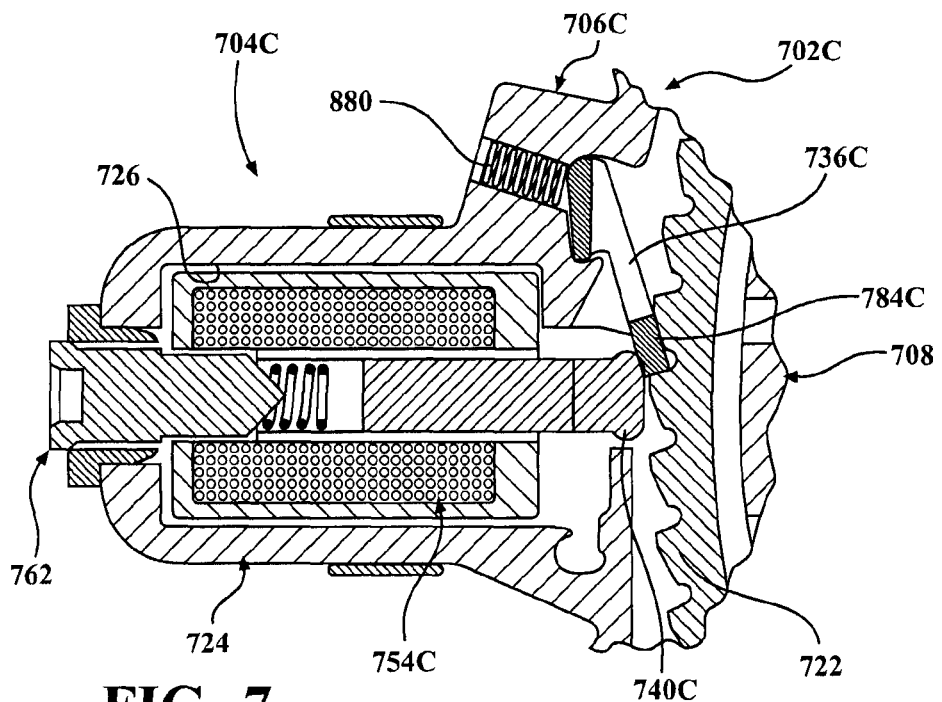
FIG. 7 is a side sectional views of another embodiment of an electromagnetic actuator module for a one-way clutch utilizing a moveable magnetic pole piece to engage and move the strut to its locked/deployed position in response to energization of the coil assembly.
Figure 8:
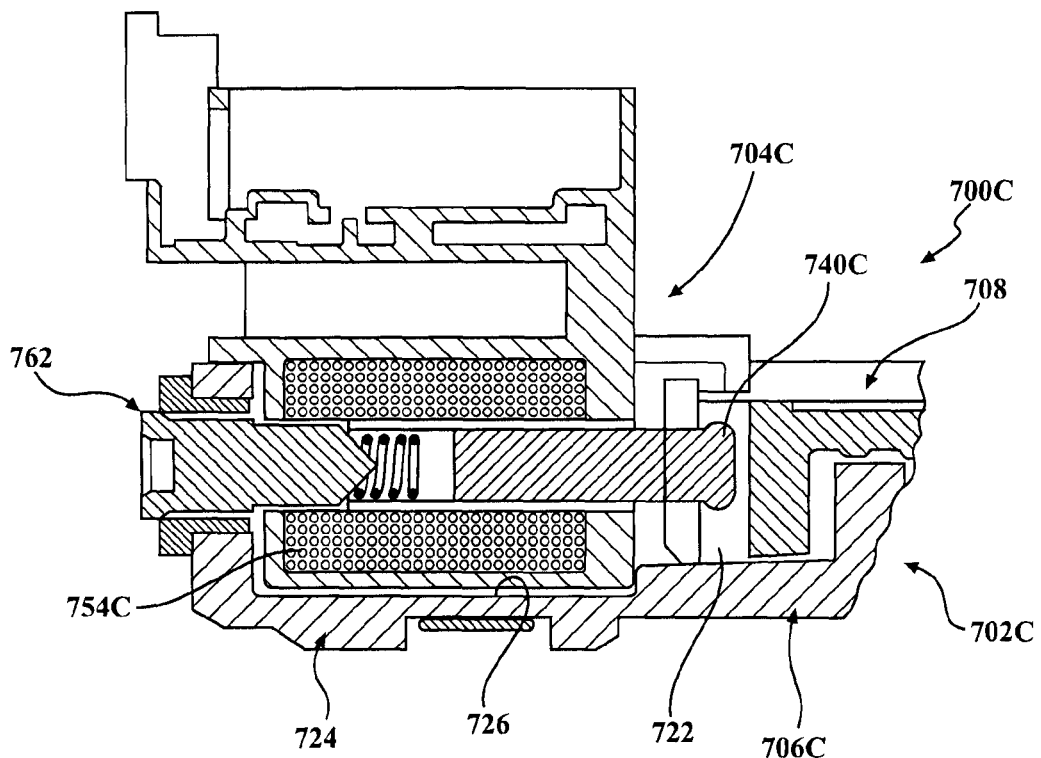
FIG. 8 is a front cross-sectional view of the embodiment of an electromagnetic actuator module of FIG. 7.
Figure 9:
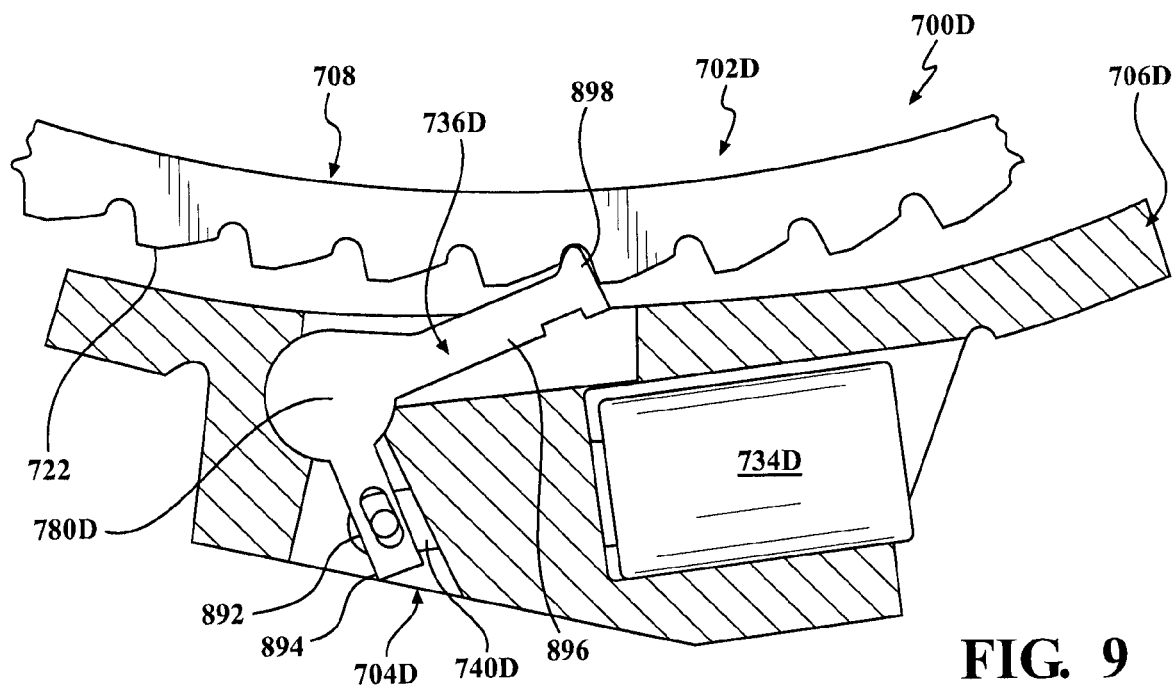
FIG. 9 is a side view of another embodiment of a solenoid-actuated electromagnetic actuator module for use in the controllable one-way clutch assemblies of the present disclosure.
Figure 10:
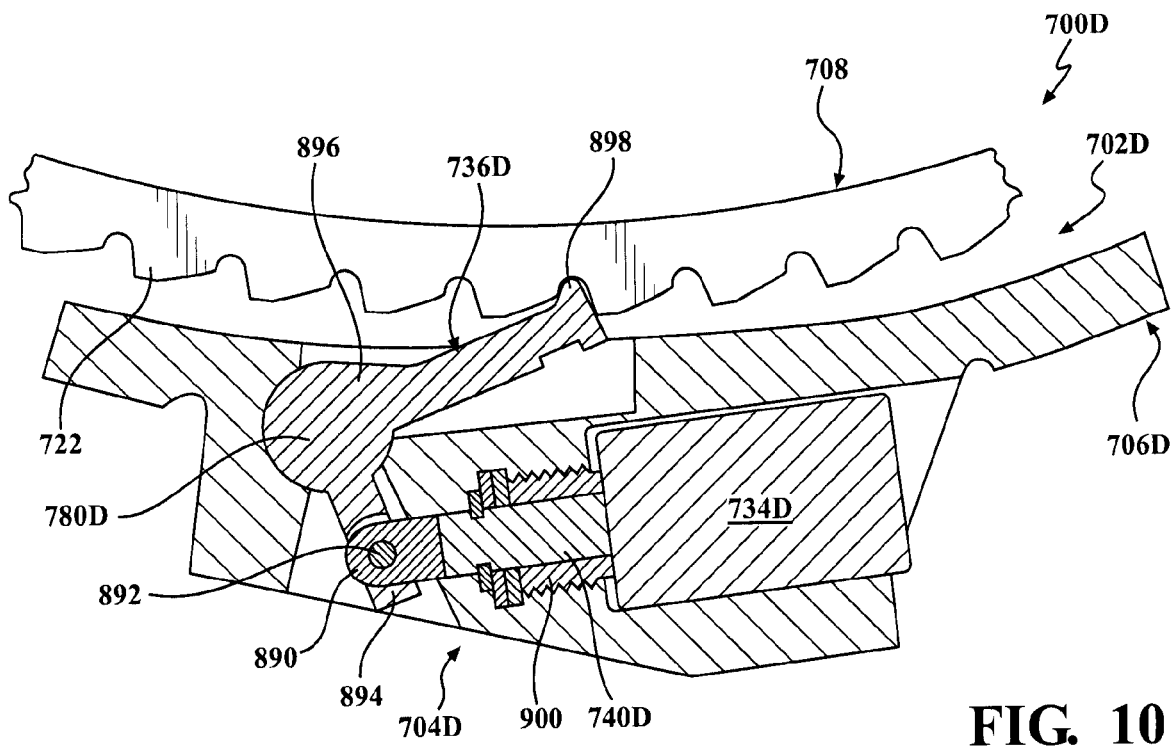
FIG. 10 is a side cutaway view of the solenoid-actuated electromagnetic actuator module of FIG. 9.

FIGS. 7-8 illustrate another alternative embodiment of an electromagnetic actuator module 704C configured for use in cooperation with clutch module 702C within a one-way clutch assembly 700C. In this arrangement a "direct-action" relationship is established between a moveable magnetic pole member 740C and an active strut 736C. Both illustrations show moveable pole piece 740C moved to an extend position relative to a stationary pole piece 762C in response to energization of a coil assembly 754C. This movement of pole piece 740C acts to forcibly pivot active strut 736C to its locked position (shown), in opposition to the biasing of a return spring 880, until its end section 784C is engaged with one of ratchet teeth 722 on inner race 708. The magnetic field generated upon energization of coil assembly 754C is amplified by a shortened version of stationary pole piece 762C which results in an increased engagement force acting on strut 736C when engaged with ratchet teeth 722. Strut 736C returns to its released position once coil assembly 754C is deactivated due to the biasing force applied thereto via spring 880.

Figure 11:
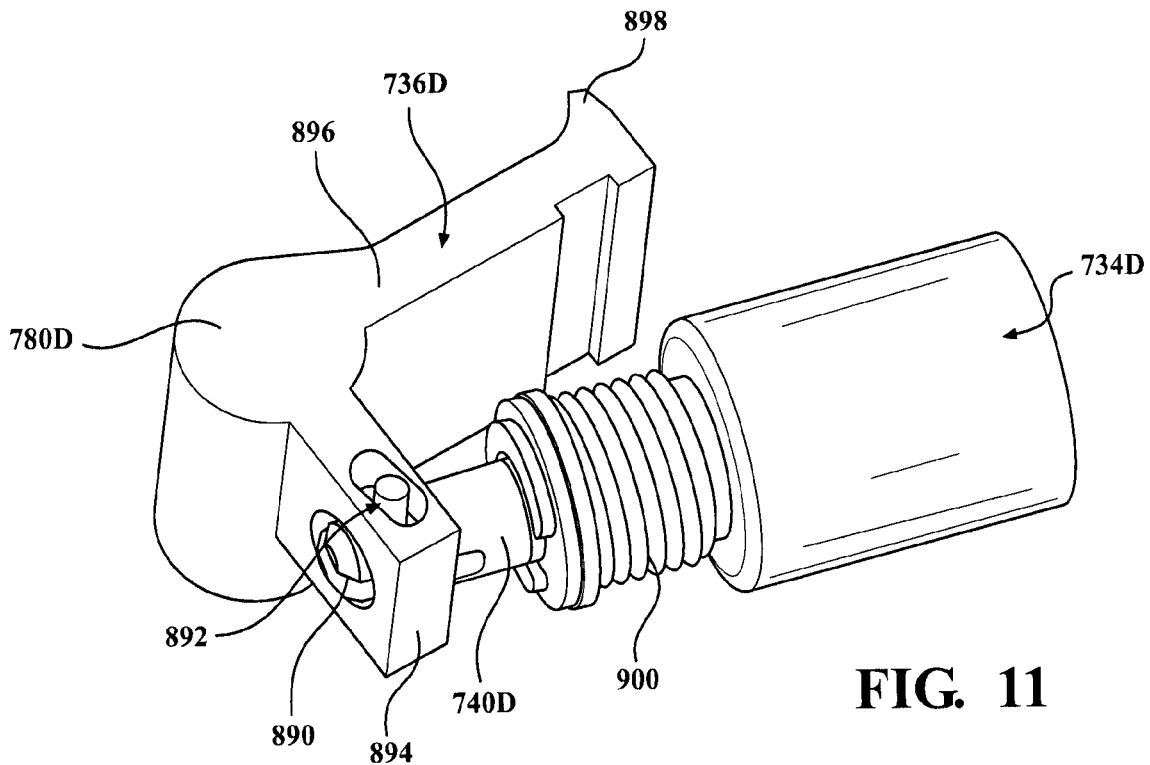
FIG. 11 is a perspective view of an active strut and electromagnetic actuator of the solenoid-actuated electromagnetic actuator module of FIG. 9.
Figure 12:
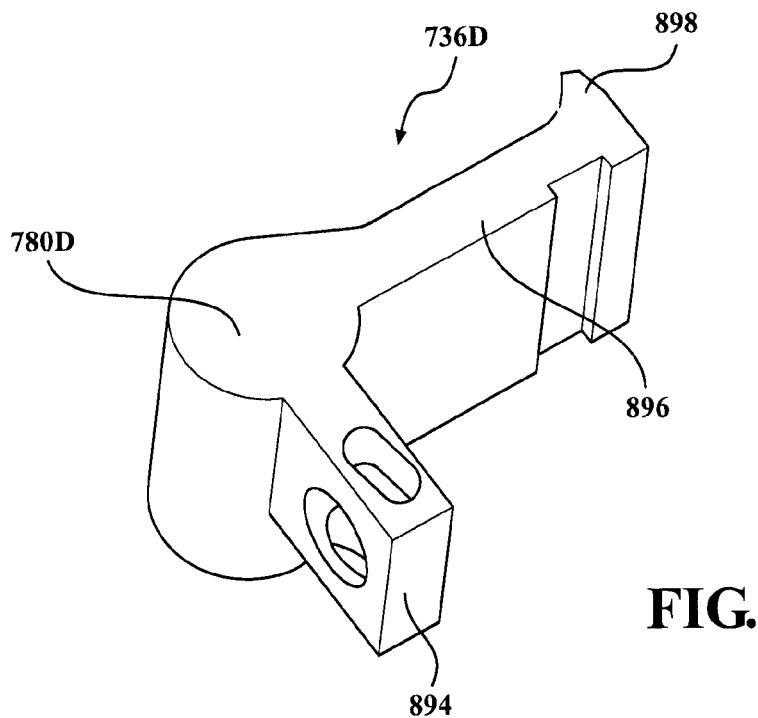
FIG. 12 is a perspective view of the active strut of FIG. 11.
Figure 13:
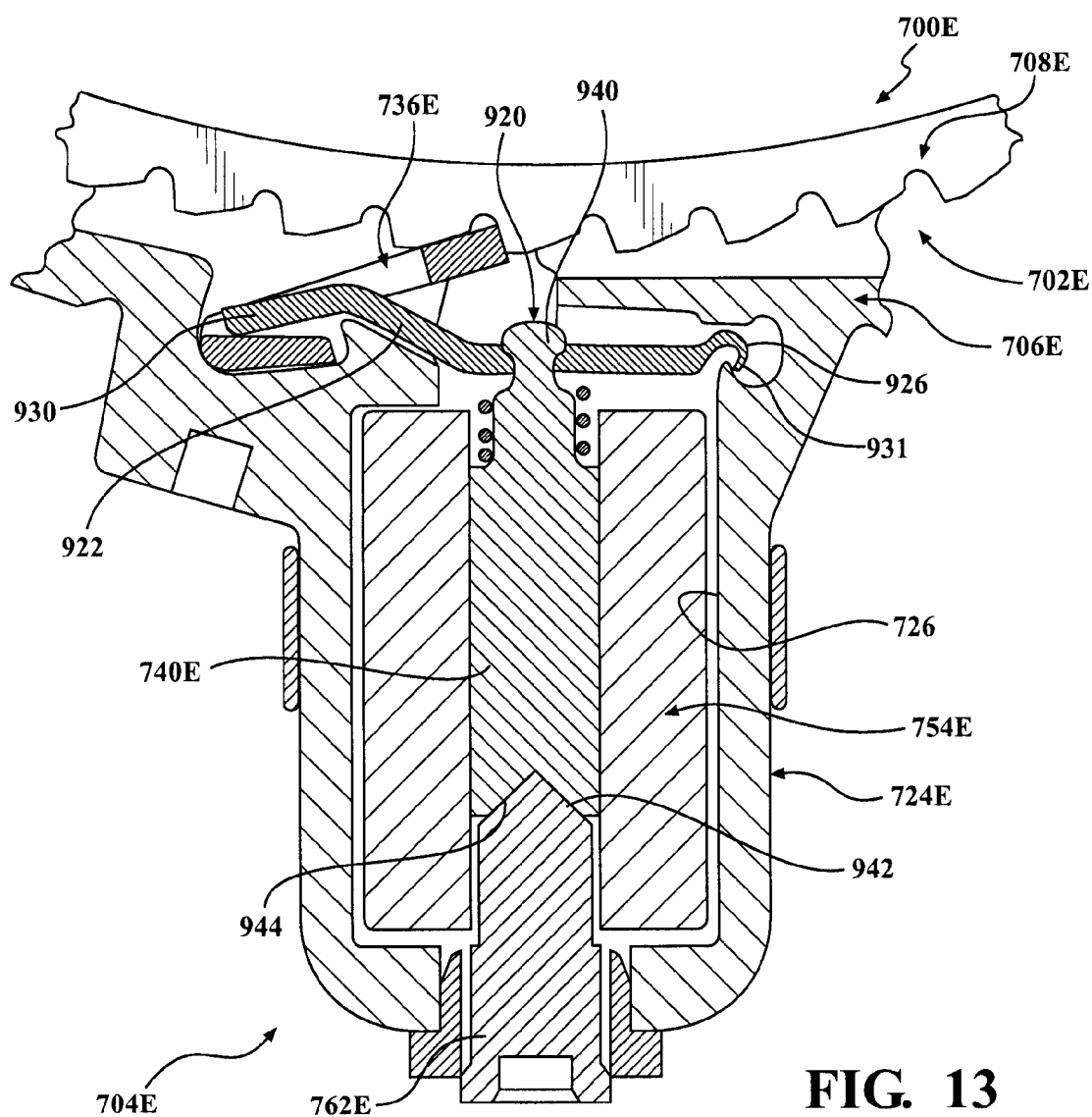
FIG. 13 is a side cross sectional view of another embodiment of an electromagnetic actuator module for use in the controllable one-way clutch assemblies of the present disclosure.

Referring now to FIGS. 9-12, yet another alternative embodiment is shown for an electromagnetic actuator module 704D configured for use with clutch module 702D within a controllable one-way clutch 700D. This arrangement aims to provide improved strut motion and actuation forces by implementing a simpler strut geometry that only pivots about a load bearing area. Strut actuation is provided by a pull-type solenoid actuator 734D having a linear plunger 740D, or actuator member with sufficient travel to ensure that the strut 736D pivots fully between its released/non-deployed and locked/deployed positions. A biasing spring 900 within the solenoid actuator 734D functions to return the strut 736D to its released position following deactivation of the solenoid actuator 734D. The arrangement also employs a strut 736D having a modified locking tip profile/revised tip end 898 adapted to interact with ratchet teeth 722 on the inner race 708. The modified locking tip profile 898 acts to reject the strut 736D out of engagement if the strut 736D is not positioned deep enough in the tooth valley. The depth of strut 736D position in the tooth valley is dependent on relative speed between the strut 736D and the inner race 708 and the spring force. As shown, the plunger 740D is linearly moveable generally in a direction that is tangential to an outer circumference of the the outer race 706D or first clutch member. A first leg 896 of strut 736D defines the modified locking tip profile/revised tip end 898. Terminal end 890 of plunger 740D is fixed via an articulating joint coupling 892 to a second leg 894 of active strut 736D which extends outwardly from a pivot post segment 780D that is pivotably supported by outer race 706D. The articulating joint coupling 892 allows the second leg 894 to pivot relative to the plunger 740D during linear movement of the plunger 740D. The second leg 894 extends about perpendicularly to the first leg 896. The spring 900 acts between solenoid housing and plunger 740D. Actuation of solenoid 734D acts to retract (pull-in) plunger 740D, in opposition to spring 900, for pivoting strut 736D to the locked position shown. FIGS. 11-12 provide additional clarity to the joint coupling 892 between plunger 740D and strut 736D.

Figure 14:
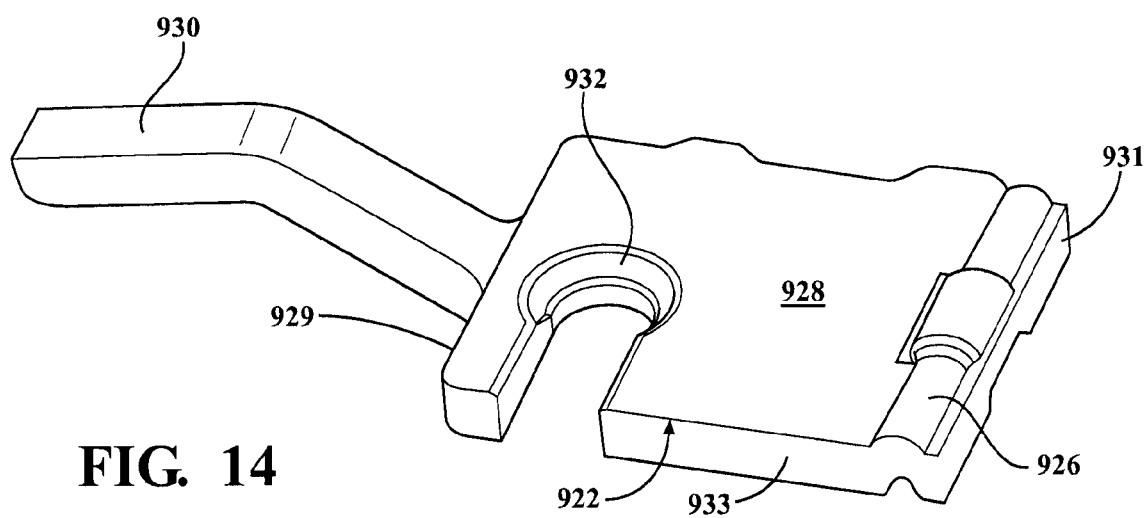
FIG. 14 is a perspective view of an armature of the electromagnetic actuator module of FIG. 13.
Figure 15A:
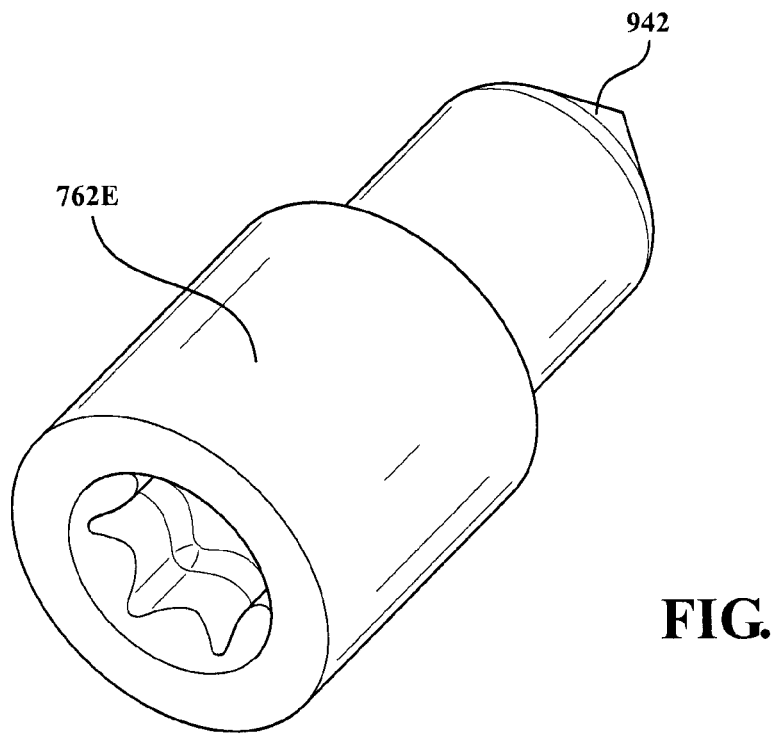
FIG. 15A is a rear perspective view of a stationary pole piece of the electromagnetic actuator module of FIG. 13.
Figure 15B:
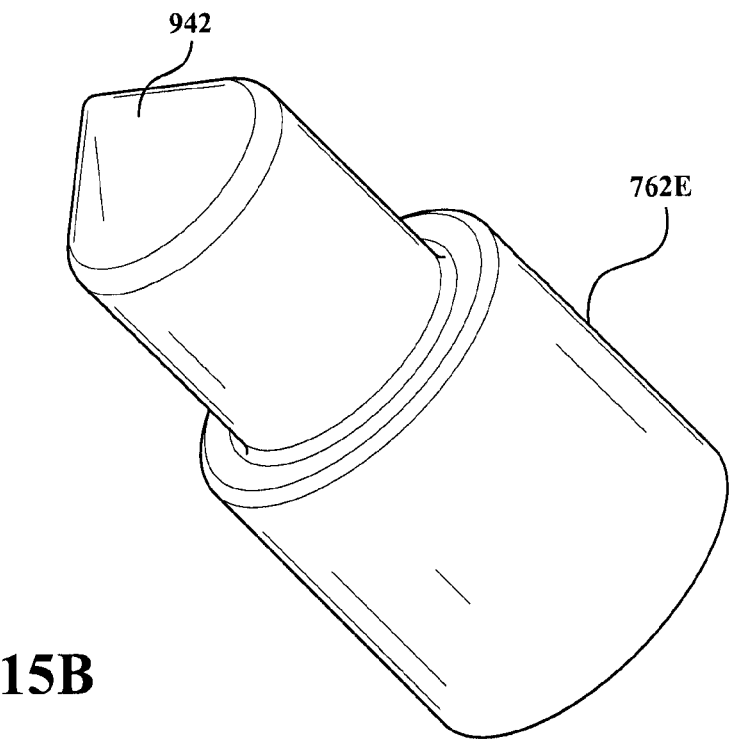
FIG. 15B is a front perspective view of the stationary pole piece of the electromagnetic actuator module of FIG. 13.
Figure 16A:
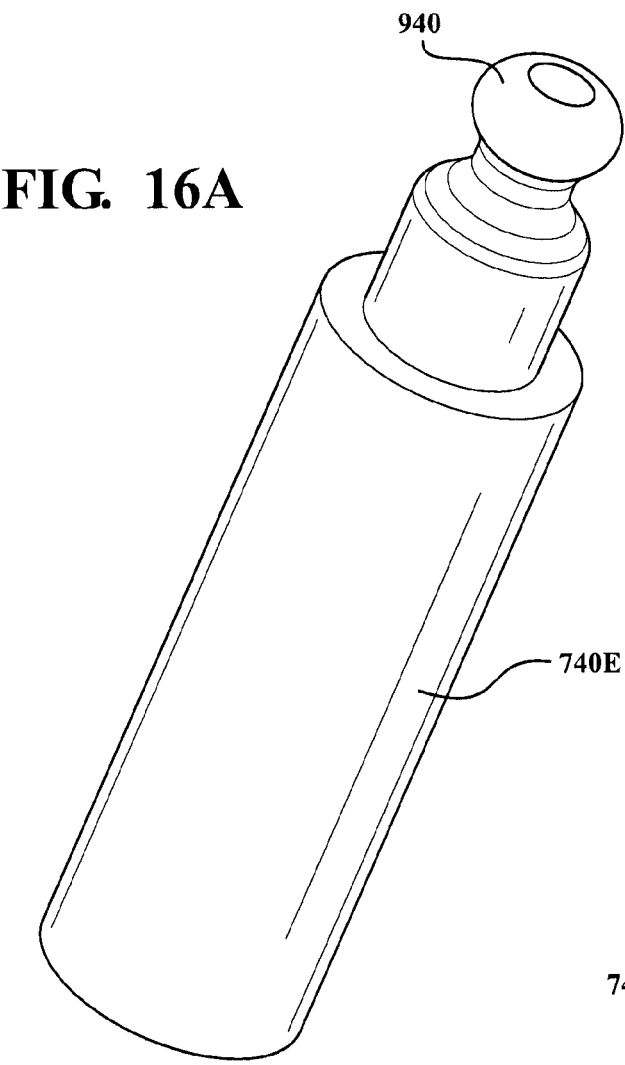
FIG. 16A is a front perspective view of a moveable pole piece of the electromagnetic actuator module of FIG. 13.
Figure 16B:
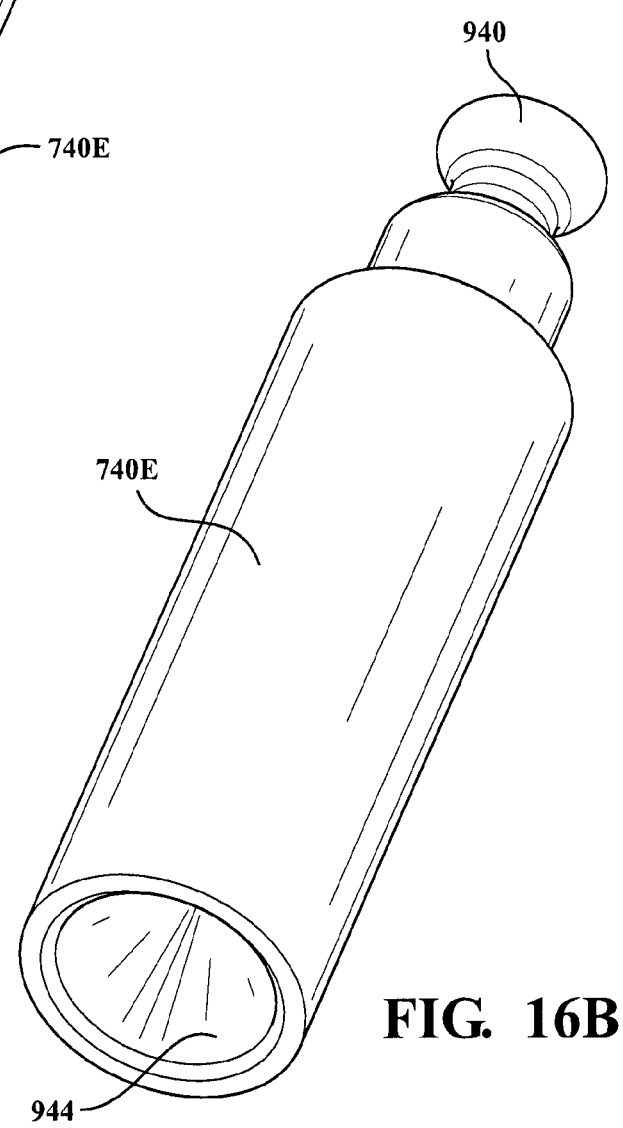
FIG. 16B is a rear perspective view of the moveable pole piece of the electromagnetic actuator module of FIG. 13.
Figure 17A:
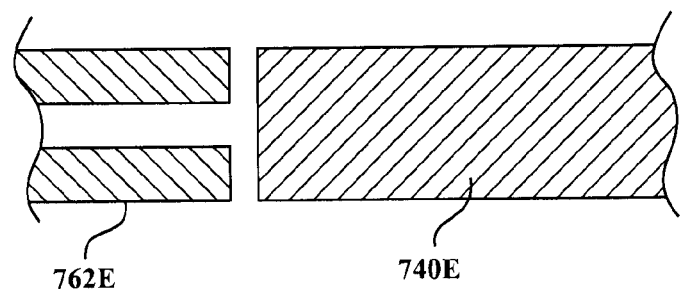
FIG. 17A is a side cross-sectional view of an alternate embodiment of stationary and moveable pole pieces that may be used in conjunction with the electromagnetic actuator module of FIG. 13.
Figure 17B:
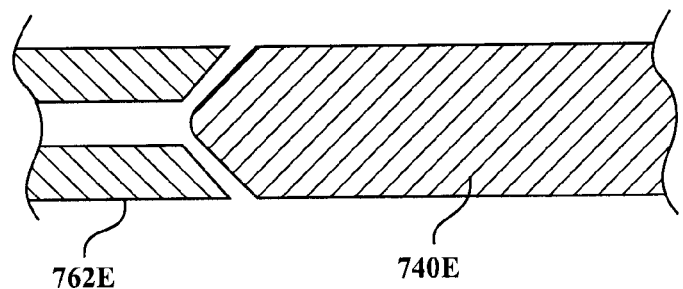
FIG. 17B is a side cross-sectional view of another alternate embodiment of stationary and moveable pole pieces that may be used in conjunction with the electromagnetic actuator module of FIG. 13.
Figure 17C:
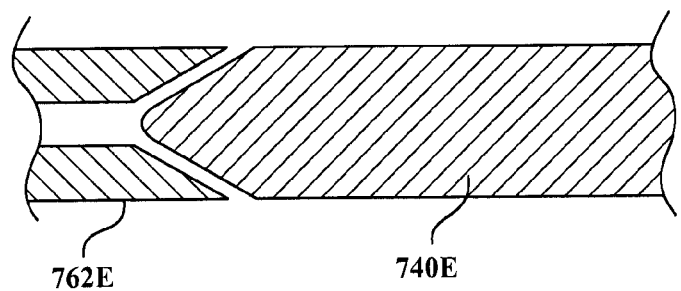
FIG. 17C is a side cross-sectional view of another alternate embodiment of stationary and moveable pole pieces that may be used in conjunction with the electromagnetic actuator module of FIG. 13.

Referring to FIGS. 13-17C, another alternative version of an electromagnetic actuator module 704E is provided. In this version moveable pole piece 740E is coupled, via a knuckle joint 920, to an armature 922 which, in turn, is mechanically engaged with active strut 736E. Armature 922 is shown in FIG. 14 to include a pivot segment 926, a plate segment 928, and a strut actuator segment 930. The plate segment 928 includes a front edge 929, a rear edge 931, and a pair of side edges 933 extending between the front and rear edges 929, 931. The pivot segment 926 is defined at the rear edge 931. The strut actuator segment 930 extends from the front edge 929 such that it is configured to engage the active strut 736E. A beveled joint aperture 932 extends into the plate segment 928 from one of the side edges 933. The joint aperture 932 is configured to accept a bulbous lug 940 formed on moveable pole piece 740E. It should be appreciated that the arrangement of the joint aperture 932 and the bulbous lug 940 allows the electromagnetic actuator module 704E to easily be assembled and disassembled. Furthermore, it allows various armature 932 and moveable pole piece 740E designs to be utilized according to specific requirements. FIGS. 15A and 15B illustrate the adjustable version of stationary pole piece 762E. FIGS. 16A and 16B illustrate moveable pole piece 740E A conical air gap is provided between male cone portion 942 on stationary pole piece 762E and female cone aperture 944 formed in moveable pole piece 740E. FIGS. 17A-17C provide alternative configurations for this conical air gap in comparison to a flat air gap.

Figure 18:
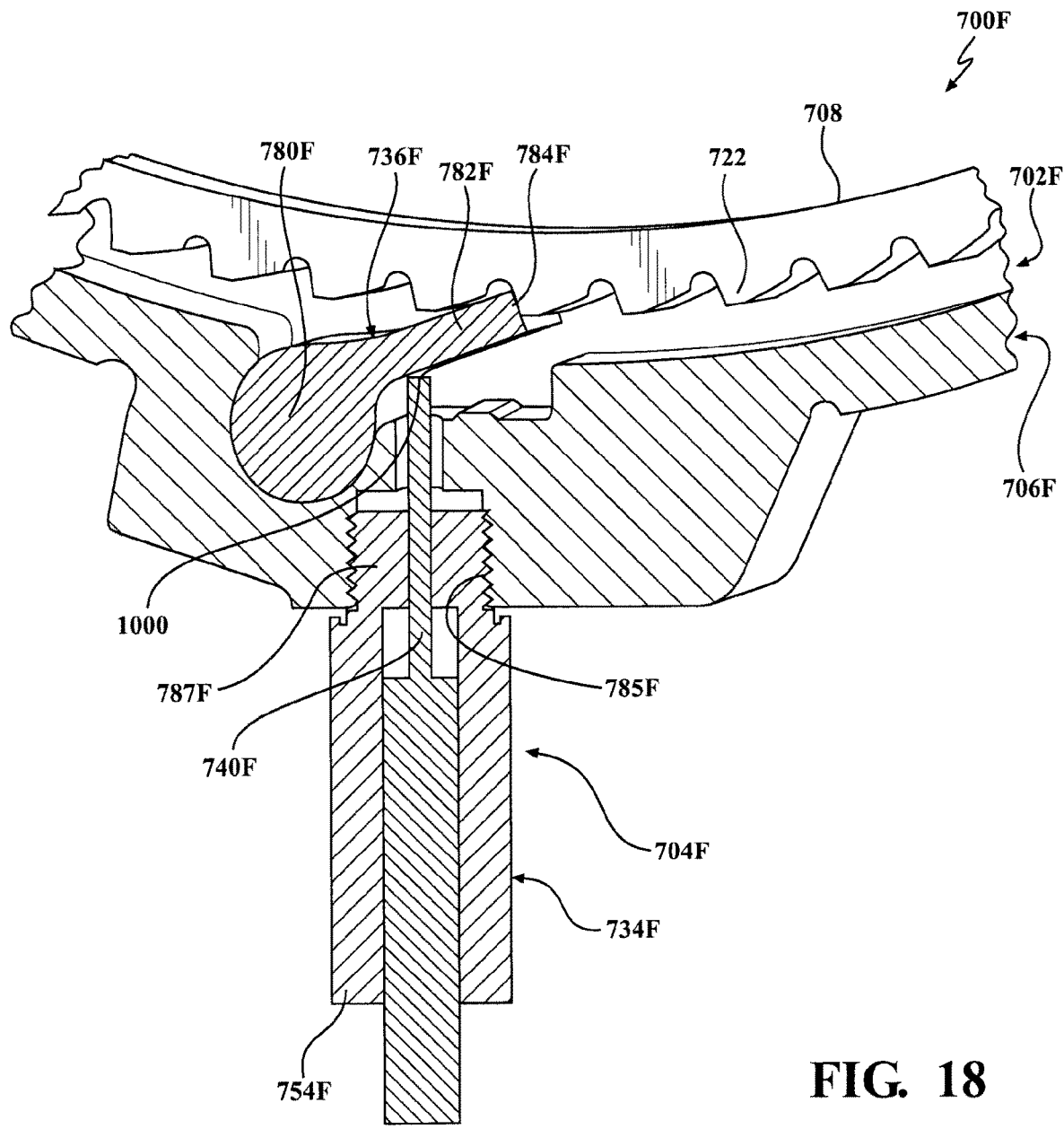
FIG. 18 is a side cross-sectional view of another embodiment of an electromagnetic actuator module for use in the controllable one-way clutch assemblies of the present disclosure, illustrating an active strut in a locked position.
Figure 19:
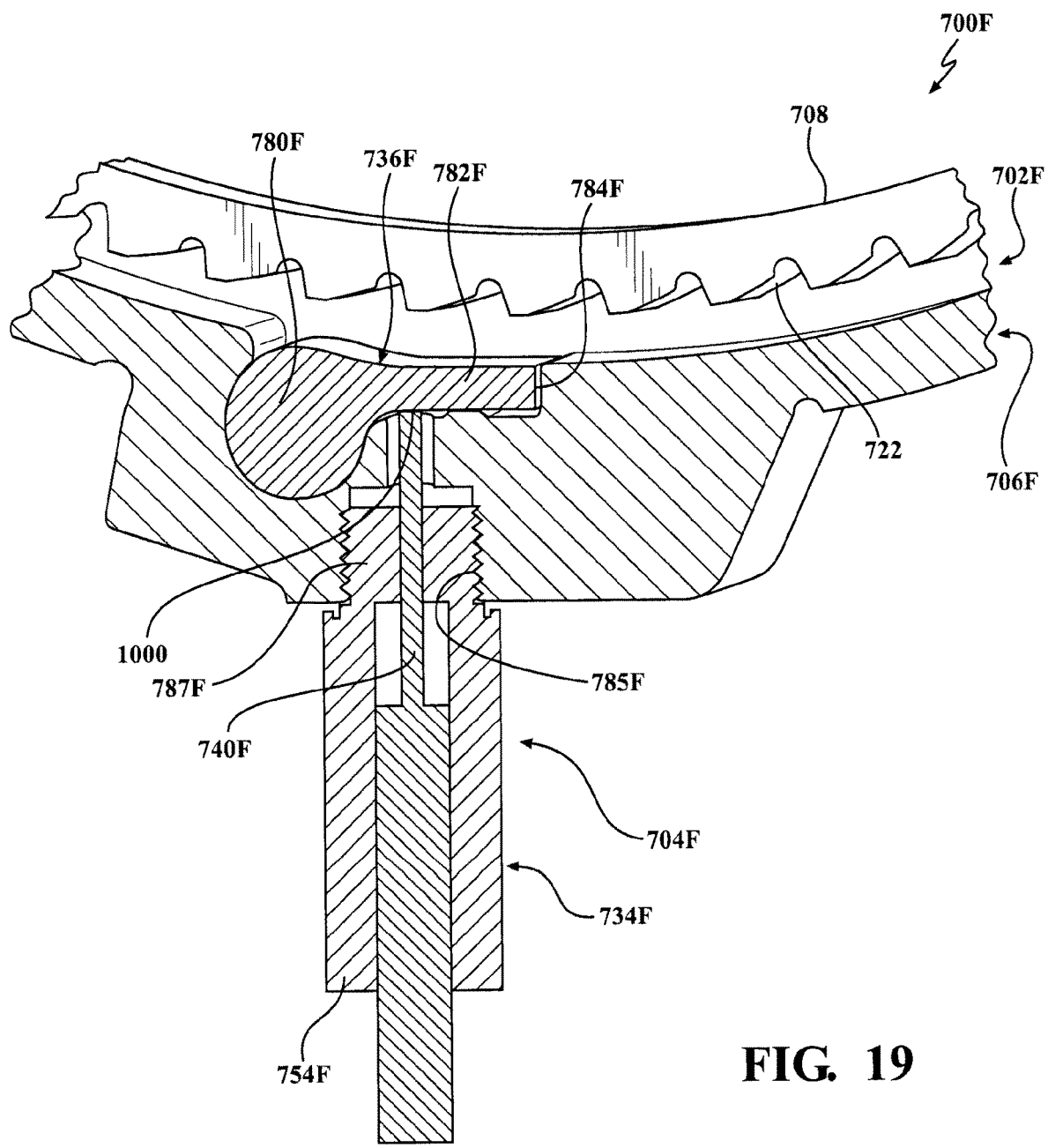
FIG. 19 is a side cross-sectional view of the electromagnetic actuator module of FIG. 18 for use in the controllable one-way clutch assemblies of the present disclosure, illustrating the active strut in a released position.
Figure 20:
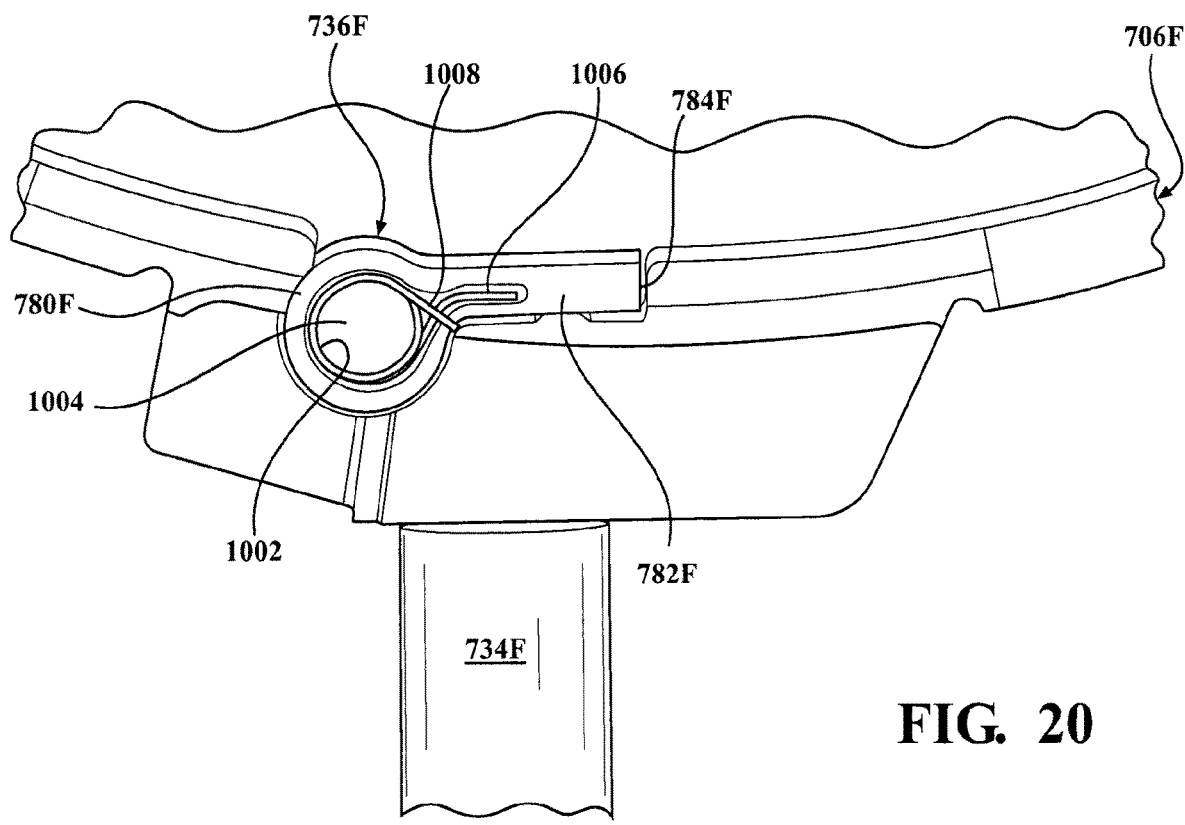
FIG. 20 is a side view of the embodiment of an electromagnetic actuator module of FIG. 18 illustrating a spring for biasing the active strut in the released position.

Referring now to FIGS. 18-20, yet another alternative embodiment is shown for an electromagnetic actuator module 704F configured for use with clutch module 702F within a controllable one-way clutch 700F. This arrangement may be useful when a pull-type solenoid (e.g., pull-type solenoid actuator 734D shown in FIGS. 9-12) cannot be packaged. This arrangement employs an electromagnetic actuator 734F including coil assembly 754F with a linearly moveable plunger 740F (i.e., push solenoid) extending radially outwardly from the inner race 708 and outer race 706F of clutch module 702F to move active strut 736F between its deployed (FIG. 18) and non-deployed (FIG. 19) positions in response to energization of coil assembly 754F. As seen, linearly moveable plunger 740F has an end segment 1000 for engaging strut segment 782F of active strut 736F. Movement of linearly moveable plunger 740F to an extended position (FIG. 18) results in an actuation force acting on an underside strut segment 782F for causing active strut 736F to pivot about pivot post segment 780F to its deployed position with its end segment 784F engaged with one of ratchet teeth 722 on inner race 708.

FIG. 19 illustrates operation of electromagnetic actuator module 704F when coil assembly 754F is de-energized. This de-energization allows active strut 736F to pivot about pivot post segment 780F to its non-deployed position with its end segment 784F disengaged with ratchet teeth 722 on inner race 708. According to this embodiment, the outer race 706F or first clutch element defines an actuator opening 785F being threaded. Furthermore, the electromagnetic actuator 734F terminates at a threaded section 787F. The threaded section 787F of the electromagnetic actuator 734F is threadedly coupled with the threaded actuator opening 785F. It should be appreciated that this threaded connection allows the electromagnetic actuator 734F to easily and quickly be connected to the outer race 706F.

As best shown in FIG. 20, active strut 736F defines a spring pocket 1002 with a circular portion 1004 disposed in pivot post segment 780F and a tang retention portion 1006 extending therefrom into the strut segment 782F. A torsion-type spring 1008 that has a pair of tangs is disposed within the spring pocket 1002, with one tang extending into the tang retention portion 1006 of spring pocket 1002 and the other tang wound in a slot (not shown) on the outer race 706F. The angle between the slot of the outer race 706F and the tang retention portion 1006 ensures a preload, which can be tuned according to different inputs. This way, the linearly moveable plunger 740F (FIGS. 18 and 19) and the active strut 736F only need to make contact in the engagement direction (i.e., to move active strut 736F to its deployed position). The active strut 736F returns to its tucked-in or non-deployed position under its spring action of torsion-type spring 1008. The linearly moveable plunger 740F returns to its power-off or disengaged position under the force of its own internal spring (not shown).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A one-way clutch assembly comprising:
a clutch module having a first clutch component and a second clutch component arranged for rotation relative to the first clutch component and having ratchet teeth; and
an electromagnetic actuator module mounted to the first clutch component and having an energizeable coil assembly having a moveable actuator member and a locking member operably connected to the actuator member;
wherein the actuator member moves from a first position to a second position in response to energization of the coil assembly for causing concurrent movement of the locking member from a released position disengaged from the ratchet teeth to a locked position engaged with the ratchet teeth;
wherein the locking member is pivotable relative to the first clutch component at a pivot post segment, wherein the locking member further includes a first leg extending from the pivot post segment for engaging the ratchet teeth, and a second leg extending from the pivot post segment at an angle relative to the first leg, and wherein the locking member is pivotable relative to the first clutch component at the pivot post segment between the locked position in which the first leg engages the ratchet teeth and the released position in which the first leg is disengaged from the ratchet teeth;
wherein the actuator member engages the second leg of the locking member and is linearly moveable against the second leg in a direction tangential to a circumference of the first clutch component in a region of the electromagnetic actuator module for causing the pivoting movement of the locking member between the released position and the locked position.

2. The one-way clutch assembly as set forth in claim 1 wherein a biasing member biases the locking member toward the released position.

3. The one-way clutch assembly as set forth in claim 2 wherein the biasing member is positioned about the actuator member and biases the actuator member into the first position to bias the locking member toward the released position.

4. The one-way clutch assembly as set forth in claim 1 wherein the actuator member is pivotably connected to the second leg.

5. The one-way clutch assembly as set forth in claim 1 wherein the first leg extends generally perpendicularly to the second leg.

6. The one-way clutch assembly as set forth in claim 1, wherein the first leg of the locking member extends between a first end and a second end, wherein the pivot member is located at the first end and wherein the first leg engages the teeth at the second end, and wherein the second leg extends from the pivot member adjacent to the first end of the first leg of the locking member.

7. A one-way clutch assembly comprising:
a clutch module having a first clutch component and a second clutch component arranged for rotation relative to the first clutch component and having ratchet teeth;
an electromagnetic actuator module mounted to the first clutch component and having an energizeable coil assembly having a moveable pole piece, and a locking member operably connected to the actuator member;
wherein the locking member is pivotably connected to the first clutch member and pivotable between a released position disengaged from the ratchet teeth and a locked position engaged with the locking teeth;
an armature pivotably connected to the first clutch component and coupling the locking member to the moveable pole piece, wherein pivoting movement of the armature causes the pivoting movement of the locking member; and
the armature including a plate segment being generally planar and overlying the locking teeth and having a front edge, a rear edge opposite the front edge, a pair of the side edges extending between the front and rear edges;
one of the side edges of the plate segment defining a joint aperture extending into the plate segment toward the other of the side edges;
the moveable pole piece extending along a pole axis and defining an annular neck portion extending inwardly toward the pole axis and received by the joint aperture to connect the moveable pole piece to the armature and to provide movement of armature in response to movement of the moveable pole piece;
wherein the pole piece moves from a first position to a second position in response to energization of the coil assembly for causing concurrent movement of the armature and concurrent movement of the locking member from a released position disengaged from the ratchet teeth to a locked position engaged with the locking teeth.

8. The one-way clutch assembly as set forth in claim 7 wherein the moveable pole piece terminates at a lug being generally bulbous above the shoulder.

9. The one-way clutch assembly as set forth in claim 8 wherein the joint aperture is beveled.

10. The one-way clutch assembly as set forth in claim 7 wherein a stationary pole piece is positioned in alignment with, and below the moveable pole piece.

11. The one-way clutch assembly as set forth in claim 10 wherein the moveable pole piece extends between a first end presenting the lug and a second end, and wherein a generally cone-shaped indentation is defined at the second end, wherein the stationary pole piece terminates at a generally cone shaped male portion, and wherein an air gap is defined between the indentation of the moveable pole piece and the stationary pole piece.

12. A one-way clutch assembly comprising:
a clutch module having a first clutch component and a second clutch component arranged for rotation relative to the first clutch component and having ratchet teeth; and
an electromagnetic actuator module mounted to the first clutch component and having an energizeable coil assembly having a moveable pole piece and a locking member operably connected to the actuator member;

wherein the pole piece is moveable linearly from a first position to a second position in response to energization of the coil assembly for causing concurrent movement of the locking member from a released position disengaged from the ratchet teeth to a locked position engaged with the locking teeth;

wherein the locking member includes a pivot segment pivotable relative to the first clutch component and an end section extending from the pivot segment for engaging the teeth of the second clutch member;

wherein a spring extends between the first clutch component and the pivot post segment of the locking member and biases the locking member in the released position;

wherein the pole piece is aligned with the end section of the locking member for providing the pivoting movement of the locking member in response to activation of the pole piece;

wherein the pole piece includes a stationary pole piece, and a moveable pole piece, and wherein the moveable pole piece and the stationary pole piece are located in alignment with one another along a pole axis radially inward of a coil assembly relative to the pole axis, and wherein a spring is located between the stationary and moveable pole piece along the pole axis.

13. A one-way clutch assembly comprising:

a clutch module having a first clutch component and a second clutch component arranged for rotation relative to the first clutch component and having ratchet teeth; and an electromagnetic actuator module mounted to the first clutch component and having an energizeable coil assembly having a moveable actuator member and a locking member operably connected to the actuator member;

wherein the actuator member moves from a first position to a second position in response to energization of the coil assembly for causing concurrent movement of the locking member from a released position disengaged from the ratchet teeth to a locked position engaged with the locking teeth;

wherein the first clutch component defines an actuator opening extending radially into the first clutch component, wherein the actuator opening is threaded, and wherein the electromagnetic actuator includes a threaded section being threadedly coupled with the first clutch component in the threaded actuator opening.

* * * * *